US012746619B2

(12) United States Patent
Manavbasi et al.

(10) Patent No.: US 12,746,619 B2
(45) Date of Patent: Sep. 29, 2026

(54) METAL ALLOY SURFACE MODIFICATION METHODS AND RELATED METAL ALLOY PRODUCTS WITH IMPROVED BOND DURABILITY

(71) Applicant: Novelis Inc., Atlanta, GA (US)

(72) Inventors: Alp Manavbasi, Kennesaw, GA (US); Stephen Buckingham, Decatur, GA (US); Brian Matthew Walczak, Acworth, GA (US); Thomas Beck, Marietta, GA (US); Theresa Elizabeth MacFarlane, Woodstock, GA (US); Lasitha Cumaranatunge, Atlanta, GA (US); Samuel Robert Wagstaff, Marietta, GA (US); John Min Ho, Marietta, GA (US)

(73) Assignee: Novelis Inc., Atlanta, GA (US)

( * ) Notice: Subject to any disclaimer, the term of this patent is extended or adjusted under 35 U.S.C. 154(b) by 849 days.

(21) Appl. No.: 17/904,303

(22) PCT Filed: Feb. 18, 2021

(86) PCT No.: PCT/US2021/018504
§ 371 (c)(1),
(2) Date: Aug. 16, 2022

(87) PCT Pub. No.: WO2021/168068
PCT Pub. Date: Aug. 26, 2021

(65) Prior Publication Data

US 2023/0077017 A1 Mar. 9, 2023

Related U.S. Application Data

(60) Provisional application No. 62/993,365, filed on Mar. 23, 2020, provisional application No. 62/984,555,
(Continued)

(51) Int. Cl.
*B23K 26/352* (2014.01)
*B23K 26/0622* (2014.01)
(Continued)

(52) U.S. Cl.
CPC ........ *B23K 26/352* (2015.10); *B23K 26/0624* (2015.10); *B23K 26/40* (2013.01);
(Continued)

(58) Field of Classification Search
CPC ................................ B23K 26/352; C22F 1/04
See application file for complete search history.

(56) References Cited

U.S. PATENT DOCUMENTS

| | | | |
|---|---|---|---|
| 6,167,609 | B1 | 1/2001 | Marinelli et al. |
| 9,802,245 | B2 | 10/2017 | Wagstaff et al. |

(Continued)

FOREIGN PATENT DOCUMENTS

| | | | |
|---|---|---|---|
| CA | 2361484 | A1 | 5/2002 |
| CN | 101880805 | A | 11/2010 |

(Continued)

OTHER PUBLICATIONS

Translation of JP-2008223085-A (Year: 2008).*
(Continued)

*Primary Examiner* — Elizabeth M Kerr
(74) *Attorney, Agent, or Firm* — Kilpatrick Townsend & Stockton LLP

(57) ABSTRACT

Described are methods of treating surfaces of metal alloy substrates and associated metal alloy products. The methods may include providing an aluminum alloy product having a bulk and a surface and scanning abeam of high energy across the surface. The method may further include applying a
(Continued)

liquid layer onto the surface prior to scanning a beam of high energy. The beam of high energy may interact with the surface and/or the liquid layer to form a treated surface. The beam of high energy may interact with the surface and/or the liquid layer to physically modify the at least a portion of the aluminum alloy product to form a treated sub-surface layer.

17 Claims, 13 Drawing Sheets

Related U.S. Application Data filed on Mar. 3, 2020, provisional application No. 62/978,767, filed on Feb. 19, 2020.

(51) Int. Cl.

| | |
|---|---|
| ***B23K 26/40*** | (2014.01) |
| ***B23K 103/10*** | (2006.01) |
| ***C22C 21/00*** | (2006.01) |
| ***C22C 21/08*** | (2006.01) |
| ***C22F 1/04*** | (2006.01) |
| ***C23C 22/07*** | (2006.01) |

(52) U.S. Cl.

CPC .............. *C22C 21/00* (2013.01); *C22C 21/08* (2013.01); *C22F 1/04* (2013.01); *C23C 22/07* (2013.01); *B23K 2103/10* (2018.08)

(56) References Cited

U.S. PATENT DOCUMENTS

| | | | | |
|---|---|---|---|---|
| 2003/0029533 | A1 | 2/2003 | Ren et al. | |
| 2009/0116999 | A1 | 5/2009 | Furu et al. | |
| 2010/0330385 | A1 * | 12/2010 | Sawaguchi .............. | C21D 7/06 425/352 |
| 2013/0180969 | A1 * | 7/2013 | Cheng .................. | B23K 26/356 219/121.85 |
| 2014/0212581 | A1 | 7/2014 | Nichols et al. | |
| 2015/0368772 | A1 | 12/2015 | Jou et al. | |
| 2016/0115575 | A1 | 4/2016 | Bull et al. | |
| 2016/0319440 | A1 | 11/2016 | Bull et al. | |
| 2017/0002448 | A1 | 1/2017 | Parson et al. | |
| 2017/0349989 | A1 * | 12/2017 | Gupta ..................... | C22C 21/06 |
| 2018/0340244 | A1 | 11/2018 | Das et al. | |
| 2019/0193185 | A1 | 6/2019 | Li et al. | |
| 2019/0194780 | A1 | 6/2019 | Li et al. | |
| 2019/0330750 | A1 | 10/2019 | Unal et al. | |
| 2020/0141006 | A1 * | 5/2020 | Epp ........................... | C09J 5/02 |

FOREIGN PATENT DOCUMENTS

| | | | |
|---|---|---|---|
| CN | 102337434 | A | 2/2012 |
| CN | 107385193 | B | 3/2019 |
| CN | 110769971 | A | 2/2020 |
| EP | 3643444 | | 4/2020 |
| JP | 10317114 | A | 12/1998 |
| JP | 2008223085 | A * | 9/2008 |
| JP | 2009513833 | A | 4/2009 |
| JP | 2010116594 | A | 5/2010 |
| JP | 2012092431 | A | 5/2012 |
| JP | 2013108124 | A | 6/2013 |
| JP | 2015519475 | A | 7/2015 |
| JP | 2016026886 | A | 2/2016 |
| JP | 2017534762 | A | 11/2017 |
| JP | 2018504525 | A | 2/2018 |
| JP | 2020514550 | A | 5/2020 |
| KR | 20190142786 | A | 12/2019 |
| WO | 2009059826 | A1 | 5/2009 |
| WO | 2019005989 | | 1/2019 |
| WO | 2019141693 | | 7/2019 |
| WO | 2020061056 | | 3/2020 |
| WO | 2020123807 | | 6/2020 |
| WO | 2021168065 | A1 | 8/2021 |

OTHER PUBLICATIONS

Alfano et al., "Study on the Role of Laser Surface Irradiation on Damage and Decohesion of Al/Epoxyjoints", International Journal of Adhesion & Adhesives, vol. 39, Dec. 2012, pp. 33-41.

Alfano et al., "Surface Patterning of Metal Substrates Through Low Power Laser Ablation for Enhanced Adhesive Bonding", The Journal of Adhesion, vol. 90, Mar. 2014, pp. 384-400.

Elkandari , "Excimer Laser Surface Melting Treatment on 7075-T6 Aluminium Alloy for Improved Corrosion Resistance", The University of Manchester, 2012, 253 pages.

Guo et al., "Increasing Strength and Fracture Toughness of AA7075-T6 Adhesively-Bonded Joints With Laser Ablation", Journal of Materials Processing Tech., vol. 259, May 2018, pp. 368-379.

International Application No. PCT/US2021/018504 , International Search Report and Written Opinion, Mailed on Jun. 18, 2021, 15 pages.

International Application No. PCT/US2021/018504 , International Search Report and Written Opinion, Mailed on May 31, 2021, 15 pages.

Saklakoglu et al., "Near Surface Modification of Aluminum Alloy Induced By Laser Shock Processing", Optics & Laser Technology. vol. 64, Dec. 2014, pp. 235-241.

Spadaro et al., "Laser Surface Treatments for Adhesion Improvement of Aluminium Alloys Structural Joints", Radiation Physics and Chemistry. vol. 76, May 24, 2007, pp. 1441-1446.

Wan et al., "Effect of Laser Ablation Treatment on Corrosion Resistance of Adhesive-bonded Al Alloy Joints", Surface & Coatings Technology, vol. 345, Mar. 2018, pp. 13-21.

Wang et al., "Near-Surface Microstructure on Twin-Roll Cast 8906 Aluminum Alloy", Metallurgical and Materials Transactions A, vol. 46, Issue 6, Apr. 2, 2015, pp. 2688-2695.

Wu et al., "Effect of Laser Ablation Surface Treatment on Performance of Adhesive-Bonded Aluminum Alloys", Surface & Coatings Technology, vol. 304, Apr. 2016, pp. 340-347.

Zhu et al., "Application of Pulsed Yb: Fiber Laser to Surface Treatment of Al Alloys for Improved Adhesive Bonded Performance", Optics and Lasers in Engineering, vol. 119, 2019, pp. 65-76.

Korean Application No. 10-2022-7027766 , "Notice of Decision to Grant", Aug. 6, 2024, 6 pages.

Lu et al., "Casting Alloys and their Melting", Mechanical Industry Press, 1st Edition, Oct. 1996, 3 pages.

Canadian Application No. 3, 169,622 , "Office Action", Aug. 18, 2023, 4 pages.

Japanese Application No. 2022-549491 , "Office Action", Jun. 27, 2023, 11 pages.

Cuff , "Beilby Layer", Rev. 0.0, Temple University, Mar. 11, 2016, 20 pages.

Japanese Application No. 2022-549491 , "Notice of Decision to Grant", Apr. 2, 2024, 5 pages.

Chinese Application No. 202180015381.9 , "Office Action", Sep. 11, 2024, 13 pages.

European Application No. 21711417.2 , "Office Action", Oct. 11, 2024, 5 pages.

Chinese Application No. 202180015381.9 , "Office Action", Apr. 1, 2023, 22 pages.

Chinese Application No. 202180015381.9 , "Office Action", Oct. 17, 2023, 17 pages.

Japanese Application No. 2022-549491 , "Office Action", Nov. 7, 2023, 12 pages.

Korean Application No. 10-2022-7027766 , "Office Action", Dec. 26, 2023, 13 pages.

"Geometrical Product Specifications (GPS)—Surface Texture: Areal—Part 2: Terms, Definitions and Surface Texture Parameters", International Standard, ISO 25178-2, Second Edition, Reference No. ISO 25178-2:2021(E), Dec. 2021, 72 pages.

Chinese Application No. 202180015381.9, "Office Action", Feb. 7, 2024, 12 pages.

"English Translation of JP 2010116594 (A)", May 27, 2010, 48 pages.

(56) References Cited

OTHER PUBLICATIONS

Canadian Application No. 3,169,622, "Office Action", Mar. 31, 2025, 3 pages.
Yan, et al., "Improve Sensitization and Corrosion Resistance of an Al—Mg Alloy by Optimization of Grain Boundaries", Scientific Reports, vol. 6, No. 26870, May 27, 2016, pp. 1-10.
Chinese Application No. 202180015381.9 , "Office Action", Mar. 21, 2024, 18 pages.
"Aluminum: Fabrication and Finishing", American Society for Metals, vol. III, 1967, 26 pages.
"International Alloy Designations and Chemical Composition Limits for Wrought Aluminum and Wrought Aluminum Alloys", The Aluminum Association, Inc., Jan. 2015, 38 pages.
CN202180015381.9, "Notice of Decision to Grant", Jun. 19, 2025, 4 pages.
Kuijpers, et al., "A Model of the fl—AlFeSi to a—Al(FeMn)Si Transformation in Al—Mg—Si Alloys", Materials Transactions, vol. 44, No. 7, May 16, 2003, pp. 1448-1456.
Kuijpers, "Intermetallic Phase Transformations During Homogenisation of 6xxx Al Alloys", A Literature Review, Feb. 2000, pp. 1-35.
Japanese Application No. 2022-549374, "Office Action", Oct. 28, 2025, 16 pages.
EP21711417.2, "Intention to Grant", Oct. 6, 2025, 8 pages.
Hatch, "Aluminum Properties and Physical Metallurgy", American Society for Metals, 1984, 5 pages.

* cited by examiner

METAL ALLOY SURFACE MODIFICATION METHODS AND RELATED METAL ALLOY PRODUCTS WITH IMPROVED BOND DURABILITY

CROSS-REFERENCE TO RELATED APPLICATIONS

This application claims the benefit of and priority to U.S. Provisional Application No. 62/978,767, filed on Feb. 19, 2020, U.S. Provisional Application No. 62/984,555, filed on Mar. 3, 2020, and U.S. Provisional Application No. 62/993,365, filed on Mar. 23, 2020, which are hereby incorporated by reference in their entireties.

FIELD

The present disclosure relates to metallurgy generally and more specifically to techniques for modifying the surface characteristics of metal alloy products, such as near-surface microstructures on the surface of the metal alloy products.

BACKGROUND

During processing of an aluminum alloy product, generation of near-surface microstructures may occur, which may include defects. For example, the defects may be or include rolled-in oxides, rolled-in oils, transfer cracks, surface cracks, interior cracks, fissures, intermetallic particles, or high density populations of alloying elements that may, for example, accumulate at the surface of the aluminum alloy product. Defects occurring within the near-surface microstructures may impact the wettability and/or the adhesion performance of the aluminum alloy product. Techniques addressing surface defects, including near-surface microstructures, are lacking.

SUMMARY

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings and each claim.

In an aspect, described are methods of treating surfaces of metal alloy substrates. A method of this aspect may include providing an aluminum alloy product having a bulk and a first surface. The methods may also include scanning a beam of high energy across the first surface. The beam of high energy may interact with the first surface and may physically modify the first surface to form a treated first surface. In embodiments, methods of treating surfaces of metal alloy substrates may include the treated first surface exhibiting a bond durability of from 45 cycles to 125 cycles, or more, according to a FLTM BV 101-07 standard test, Stress Durability Test for Adhesive Lap-Sear Bonds (2017). In embodiments, the aluminum alloy product may include a 5xxx series aluminum alloy, a 6xxx series aluminum alloy, or a 7xxx series aluminum alloy.

In various embodiments, the method may further include applying a first liquid layer onto the first surface prior to scanning a beam of high energy. Scanning the beam of high energy may be across and/or through the first liquid layer. The beam of high energy may interact with the first liquid layer to form the treated first surface. The beam of high energy may interact with the first liquid layer to physically modify at least a portion of the bulk to form a treated sub-surface layer. The bulk portion to be modified may include intermetallic particles and a matrix including grains of an aluminum alloy. In exemplary embodiments, the treated sub-surface layer may include a resolidified layer of the aluminum alloy having been previously melted by the beam of high energy. The sub-surface layer may occupy a depth into the aluminum alloy product of from 1 μm to 10 μm. In embodiments, a first concentration of intermetallic particles in the treated sub-surface layer may be less than a second concentration of intermetallic particles in the bulk. In some embodiments, the first liquid layer may have a thickness of from 1 nm to 1 mm. In other embodiments, the first liquid layer may have a thickness of from 1 mm to 5 mm.

In embodiments, the methods of treating surfaces of metal alloy substrates may further include applying a second liquid layer to a second surface. The second surface may be opposite the first surface. In some embodiments, the second liquid layer may have a thickness of from 1 nm to 1 mm. In other embodiments, the second liquid layer may have a thickness of from 1 mm to 5 mm. The second liquid layer may be the same as the first liquid layer, or alternatively, the second liquid layer may be different than the first liquid layer. In some embodiments, at least one of the first liquid layer and the second liquid layer may include an aqueous solution. In some embodiments, at least one of the first liquid layer and the second liquid layer may include a non-aqueous solution. In some embodiments, at least one of the first liquid layer and the second liquid layer may include glycerin, alcoholic solutions, steam, or any combination thereof. In exemplary embodiments, at least one of the first liquid layer and the second liquid layer may include a pretreatment chemical configured to inhibit corrosion, texturize the surface, and/or increase adhesion. The pretreatment chemical may be chosen from organophosphonic acid, organophosphinic acid, a silane, a coupling agent, a polymer, a copolymer, a Zr/Mo pretreatment, a Mn-based pretreatment, a Ce-based pretreatment, adhesion promoters, corrosion inhibitors, any suitable pretreatment solutions, or combinations thereof.

In various embodiments, the methods of treating surfaces of metal alloy substrates may include applying the first liquid layer and the second liquid layer onto the first surface and the second surface by two or more applicators. The two or more applicators may include a spray applicator with or without pulsing, a low pressure high volume spray applicator, a low pressure low volume spray applicator, a rotary atomizer, an electrostatic applicator, a roll applicator, or any combination thereof. In embodiments, the two or more applicators may be in a continuous line. In embodiments, the two or more applicators may be configured as two or more applicator baths.

In embodiments, scanning a beam of high energy across the first surface or the first liquid layer may include directing a beam of laser energy onto the first liquid layer. The beam of laser energy may be provided by a continuous laser, a pulsed laser, a nanosecond pulsed laser, a picosecond pulsed laser, a femtosecond pulsed laser, a single pass configuration, a double pass configuration, a laser with continuous wave, a laser without continuous wave, or any combination thereof. The beam of laser energy may be provided by a ytterbium laser, a Nd-YAG laser, a $CO_2$ laser, an excimer laser, any beam of light or waves with energy levels that can interact and couple with metal surfaces, or any combination thereof. The beam of laser energy may have a wavelength from about 200 nm to about 1500 nm in some examples.

In some embodiments, the methods of treating surfaces of metal alloy substrates may include scanning the beam of high energy across and/or through the first liquid layer. This may include directing at least one beam of laser energy onto the first liquid layer. The method may further include directing another at least one beam of laser energy onto the second liquid layer.

In some embodiments, the methods of treating surfaces of metal alloy substrates may include a first surface that is an untreated first surface. The untreated first surface may have one or more of organics, oils, hydrocarbons, soils, or inorganic residues thereon. The treated first surface may be devoid of or substantially devoid of one or more of organics, oils, hydrocarbons, soils, or inorganic residues. In some embodiments, the untreated first surface may have not been subjected to one or more wet processing steps selected from chemical etching, acidic or alkaline cleaning, solvent cleaning, vapor degreasing, mechanical surface treatment, brushing, buffing, mechanical surface polishing, electrochemical polishing, chemical polishing, surfactant cleaning, and conversion coating. In some embodiments, the untreated first surface may have not been subjected to the one or more wet processing steps prior to directing the beam of high energy onto the untreated first surface. In some embodiments, the untreated first surface may correspond to a rolled surface having a rolling lubricant thereon. In embodiments, directing a beam of high energy onto the untreated first surface may correspond to a dry cleaning process, and wherein the treated first surface corresponds to a cleaned surface. In embodiments, directing a beam of high energy onto the untreated first surface may correspond to a dry surface modification process, The treated first surface may correspond to an activated surface suitable for bonding with an adhesive. The first surface may include near-surface microstructures. Directing the beam of energy onto the first surface may remove or eliminate at least a portion of the near-surface microstructures. Directing the beam of high energy onto the first surface may thermally modify the near-surface microstructures. In embodiments, the treated first surface exhibits a dry static friction coefficient of from 0.1 to 0.5, although surfaces having a dry static friction coefficient out of this range are also contemplated.

In another aspect, described are metal alloy products with treated surfaces. The metal alloy products such as a rolled aluminum alloy substrate may include a bulk and a laser-treated area. The bulk may include intermetallic particles and a matrix including grains of an aluminum alloy. The laser-treated area may cover a first portion of the bulk. The laser-treated area may include a treated sub-surface layer. The treated sub-surface layer may include a resolidified layer of the aluminum alloy, having been previously melted by a beam of high energy. The treated sub-surface layer may occupy a depth into the aluminum alloy product of from 1 μm to 10 μm. A first concentration of intermetallic particles in the treated sub-surface layer may be less than a second concentration of intermetallic particles in the bulk. The treated sub-surface layer may be or may further include a laser processed surface layer. The laser processed surface layer may be devoid or substantially devoid of near surface microstructures. The laser processed surface layer may be devoid or substantially devoid of one or more of organics, oils, hydrocarbons, soils, inorganic residues, rolled-in oxides, or anodic oxides. The laser processed surface layer may include a first oxide layer having a thickness of from 10 nm to 300 nm. In some embodiments, the laser treated area may exhibit a bond durability of from 45 cycles to 125 cycles, or more, according to a FLTM BV 101-07 standard test.

In embodiments, the aluminum alloy may include a 5xxx series aluminum alloy, a 6xxx series aluminum alloy, or a 7xxx series aluminum alloy. In embodiments, a concentration of magnesium in the aluminum alloy may be less than 10 wt. %. A concentration of magnesium in the bulk may be greater than in the treated sub-surface layer. A concentration of zinc in the bulk may be greater than in the treated sub-surface layer. In various embodiments, the aluminum alloy product may not include a functionalized layer thereon. An example of a functionalized layer may include a phosphorus containing organic acid coating or pretreatment layer.

In some embodiments, the aluminum alloy may further include an untreated area covering a second portion of the bulk. The untreated area may not or may not have been subjected a laser treatment process. In embodiments, a first arithmetical mean height (Spk) of the laser treated area may be less than a second arithmetical mean height of the untreated area. In embodiments, the laser-treated area exhibits an arithmetic mean height (Sa) of from 0.1 μm to 10 μm. In embodiments, the laser-treated area may exhibit a complexity (Sdr) of from 0.1% to 80%.

In various embodiments, the laser-treated area may exhibit a surface stability of up to 3 months or up to 6 months, for example, which may indicate that the laser-treated area is suitable for bonding to another product during any time while the surface is stable. Stated another way, the laser-treated area may be stable for up to 3 months or up to 6 months and exhibit a bond durability of from 45 cycles to 125 cycles, or more, according to a FLTM BV 101-07 standard test or other standard test despite not being initially bonded for the period of up to 3 months or up to 6 months. Such surface stability may allow for storage and/or some delay between preparation and bonding to another product without the durability of the resultant bond suffering or degrading prematurely.

Other objects and advantages will be apparent from the following detailed description of non-limiting examples.

BRIEF DESCRIPTION OF THE FIGURES

The specification makes reference to the following appended figures, in which use of like reference numerals in different figures is intended to illustrate like or analogous components.

DETAILED DESCRIPTION

Figure 1:
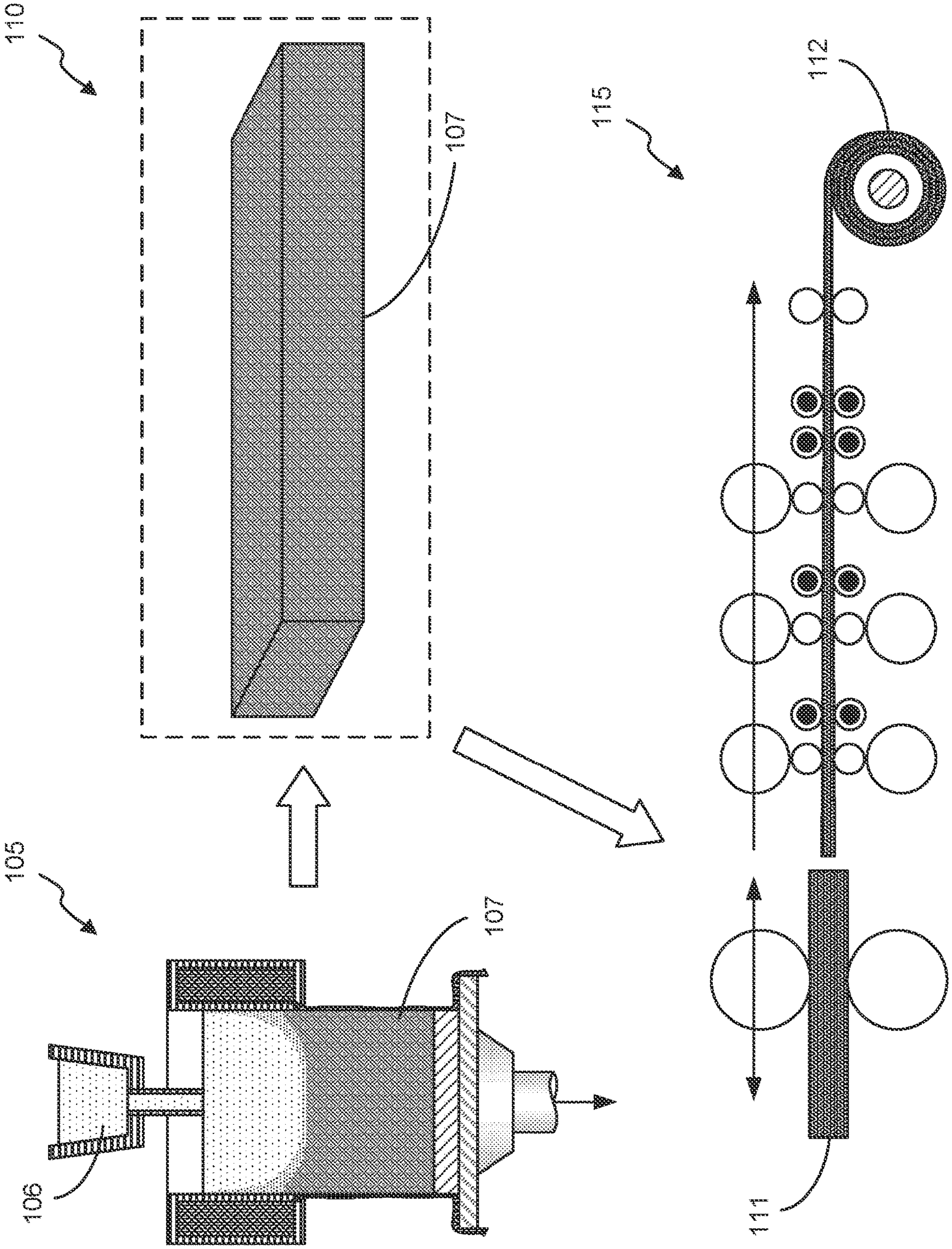
FIG. 1 provides a schematic overview of a method for making a metal alloy product.

Described herein are metal and metal alloy products generated by casting and/or rolling processing in which the near-surface microstructures of a product having an untreated surface are affected by a beam of high energy to provide a modified surface, which may be a cleaned, textured, activated, or otherwise prepared or treated surface, as well as the methods for generating such products. The untreated surface may exhibit near-surface microstructures, which may occupy a region to a depth into a bulk of the product and may contain one or more defects. In some cases, the near-surface microstructures or defects may be reduced or eliminated by treatment with the beam of high energy. The beam of high energy may optionally be directed onto a liquid layer in contact with the surface of the metal alloy product, and interaction between the beam of high energy, the optional liquid layer, and the surface may result in modification of the surface of the metal alloy product. The modified surface may have a composition that is different from a composition of the near-surface microstructures of the product having an untreated surface. Benefits may include better weldability (e.g., spot weldability) with longer tip life as well as improved paint adhesion and/or corrosion resistance. The modified surface may have wettability and/or bond durability properties that are improved as compared with that of a product having an untreated surface. For example, the modified surface may exhibit an improved bond durability condition as compared to the untreated surface.

Definitions and Descriptions

As used herein, the terms “invention,” “the invention,” “this invention” and “the present invention” are intended to refer broadly to all of the subject matter of this patent application and the claims below. Statements containing these terms should be understood not to limit the subject matter described herein or to limit the meaning or scope of the patent claims below.

In this description, reference is made to alloys identified by AA numbers and other related designations, such as “series” or “7xxx.” For an understanding of the number designation system most commonly used in naming and identifying aluminum and its alloys, see "International Alloy Designations and Chemical Composition Limits for Wrought Aluminum and Wrought Aluminum Alloys" or "Registration Record of Aluminum Association Alloy Designations and Chemical Compositions Limits for Aluminum Alloys in the Form of Castings and Ingot," both published by The Aluminum Association.

As used herein, a plate generally has a thickness of greater than about 15 mm. For example, a plate may refer to an aluminum product having a thickness of greater than about 15 mm, greater than about 20 mm, greater than about 25 mm, greater than about 30 mm, greater than about 35 mm, greater than about 40 mm, greater than about 45 mm, greater than about 50 mm, or greater than about 100 mm.

As used herein, a shate (also referred to as a sheet plate) generally has a thickness of from about 4 mm to about 15 mm. For example, a shate may have a thickness of about 4 mm, about 5 mm, about 6 mm, about 7 mm, about 8 mm, about 9 mm, about 10 mm, about 11 mm, about 12 mm, about 13 mm, about 14 mm, or about 15 mm.

As used herein, a sheet generally refers to an aluminum product having a thickness of less than about 4 mm. For example, a sheet may have a thickness of less than about 4 mm, less than about 3 mm, less than about 2 mm, less than about 1 mm, less than about 0.5 mm, or less than about 0.3 mm (e.g., about 0.2 mm).

Reference may be made in this application to alloy temper or condition. For an understanding of the alloy temper descriptions most commonly used, see "American National Standards (ANSI) H35 on Alloy and Temper Designation Systems." An F condition or temper refers to an aluminum alloy as fabricated. An O condition or temper refers to an aluminum alloy after annealing. An Hxx condition or temper, also referred to herein as an H temper, refers to a non-heat treatable aluminum alloy after cold rolling with or without thermal treatment (e.g., annealing). Suitable H tempers include HX1, HX2, HX3 HX4, HX5, HX6, HX7, HX8, or HX9 tempers. A T1 condition or temper refers to an aluminum alloy cooled from hot working and naturally aged (e.g., at room temperature). A T2 condition or temper refers to an aluminum alloy cooled from hot working, cold worked and naturally aged. A T3 condition or temper refers to an aluminum alloy solution heat treated, cold worked, and naturally aged. A T4 condition or temper refers to an aluminum alloy solution heat treated and naturally aged. A T5 condition or temper refers to an aluminum alloy cooled from hot working and artificially aged (at elevated temperatures). A T6 condition or temper refers to an aluminum alloy solution heat treated and artificially aged. A T7 condition or temper refers to an aluminum alloy solution heat treated and artificially overaged. A T8x condition or temper refers to an aluminum alloy solution heat treated, cold worked, and artificially aged. A T9 condition or temper refers to an aluminum alloy solution heat treated, artificially aged, and cold worked. A W condition or temper refers to an aluminum alloy after solution heat treatment.

As used herein, terms such as "cast metal product," "cast product," "cast aluminum alloy product," and the like are interchangeable and refer to a product produced by direct chill casting (including direct chill co-casting) or semi-continuous casting, continuous casting (including, for example, by use of a twin belt caster, a twin roll caster, a block caster, or any other continuous caster), electromagnetic casting, hot top casting, or any other casting method.

As used herein, the meaning of "room temperature" can include a temperature of from about 15° C. to about 30° C., for example about 15° C., about 16° C., about 17° C., about 18° C., about 19° C., about 20° C., about 21° C., about 22° C., about 23° C., about 24° C., about 25° C., about 26° C., about 27° C., about 28° C., about 29° C., or about 30° C. As used herein, the meaning of "ambient conditions" can include temperatures of about room temperature, relative humidity of from about 20% to about 100%, and barometric pressure of from about 975 millibar (mbar) to about 1050 mbar. For example, relative humidity can be about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, about 50%, about 51%, about 52%, about 53%, about 54%, about 55%, about 56%, about 57%, about 58%, about 59%, about 60%, about 61%, about 62%, about 63%, about 64%, about 65%, about 66%, about 67%, about 68%, about 69%, about 70%, about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, about 99%, about 100%, or anywhere in between. For example, barometric pressure can be about 975 mbar, about 980 mbar, about 985 mbar, about 990 mbar, about 995 mbar, about 1000 mbar, about 1005 mbar, about 1010 mbar, about 1015 mbar, about 1020 mbar, about 1025 mbar, about 1030 mbar, about 1035 mbar, about 1040 mbar, about 1045 mbar, about 1050 mbar, or anywhere in between.

All ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more, e.g. 1 to 6.1, and ending with a maximum value of 10 or less, e.g., 5.5 to 10. Unless stated otherwise, the expression "up to" when referring to the compositional amount of an element means that element is optional and includes a zero percent composition of that particular element. Unless stated otherwise, all compositional percentages are in weight percent (wt %).

As used herein, the meaning of "a," "an," and "the" includes singular and plural references unless the context clearly dictates otherwise.

In the present description, aluminum alloy products and their components may be described in terms of their elemental composition in weight percent (wt %). In each alloy, the remainder is aluminum, with a maximum wt % of 0.15% for the sum of all impurities.

Incidental elements, such as grain refiners and deoxidizers, or other additives may be present in the invention and may add other characteristics on their own without departing from or significantly altering the alloy described herein or the characteristics of the alloy described herein.

Unavoidable impurities, including materials or elements, may be present in an alloy in minor amounts due to inherent properties of aluminum or leaching from contact with processing equipment. Some alloys, as described, may contain no more than about 0.25 wt % of any element besides the alloying elements, incidental elements, and unavoidable impurities.

Methods of Producing the Alloys and Aluminum Alloy Products

The alloys described herein can be cast using any suitable casting method known to those of ordinary skill in the art. As a few non-limiting examples, the casting process can include a direct chill (DC) casting process or a continuous casting (CC) process. The continuous casting process may include a continuous casting system having a pair of moving opposed casting surfaces (e.g., moving opposed belts, rolls or blocks), a casting cavity between the pair of moving opposed casting surfaces, and a molten metal injector. The molten metal injector can have an end opening from which molten metal can exit the molten metal injector and be injected into the casting cavity.

A cast ingot, cast slab, or other cast product can be processed by any suitable means. Optional processing steps include, but are not limited to, homogenization, hot rolling, cold rolling, solution heat treatment, and an optional pre-aging step. A cast aluminum alloy product, such as a cast ingot or other cast product, can be processed by any means known to those of skill in the art. Optionally, the processing steps can be used to prepare sheets.

The cast products described herein can be used to make products in the form of sheets, plates, or other suitable products. For example, plates including the products as described herein can be prepared by processing an ingot in a homogenization step or casting a product in a continuous caster followed by a hot rolling step. In the hot rolling step, the cast product can be hot rolled to a 200 mm thick gauge or less (e.g., from about 10 mm to about 200 mm). For example, the cast product can be hot rolled to a plate having a final gauge thickness of about 10 mm to about 175 mm, about 15 mm to about 150 mm, about 20 mm to about 125 mm, about 25 mm to about 100 mm, about 30 mm to about 75 mm, or about 35 mm to about 50 mm. In some cases, plates may be rolled into thinner metal products, such as sheets.

FIG. 1 provides an overview of an exemplary method of making a metal alloy product. The method of FIG. 1 begins at step 105 where a metal alloy 106 is cast to create a cast metal alloy product 107, such as an ingot or other cast product. At optional step 110, the cast metal alloy product 107, which may be a cast aluminum alloy product, is homogenized to generate a homogenized metal alloy product 111. At step 115, the homogenized metal alloy product 111 is subjected to one or more hot rolling passes and/or one or more cold rolling passes to generate a rolled metal alloy product 112, which may correspond to an aluminum alloy article, such as an aluminum alloy plate, an aluminum alloy shate, or an aluminum alloy sheet. Optionally, the rolled metal alloy product 112 is subjected to one or more forming or stamping processes to form a metal alloy article.

The metals or metal alloys described herein, which may be aluminum alloys, can be cast using any suitable casting method. Exemplary casting processes include direct chill casting (including direct chill co-casting), semi-continuous casting, continuous casting (including, for example, by use of a twin belt caster, a twin roll caster, a block caster, or any other continuous caster), electromagnetic casting, hot top casting, or any other casting method. As a few non-limiting examples, the casting process can include a direct chill (DC) casting process or a continuous casting (CC) process. For example, FIG. 1 depicts a schematic illustration of a DC casting process at 105. A continuous casting system can include a pair of moving opposed casting surfaces (e.g., moving opposed belts, rolls or blocks), a casting cavity between the pair of moving opposed casting surfaces, and a molten metal injector. The molten metal injector can have an end opening from which molten metal can exit the molten metal injector and be injected into the casting cavity.

Figure 2:
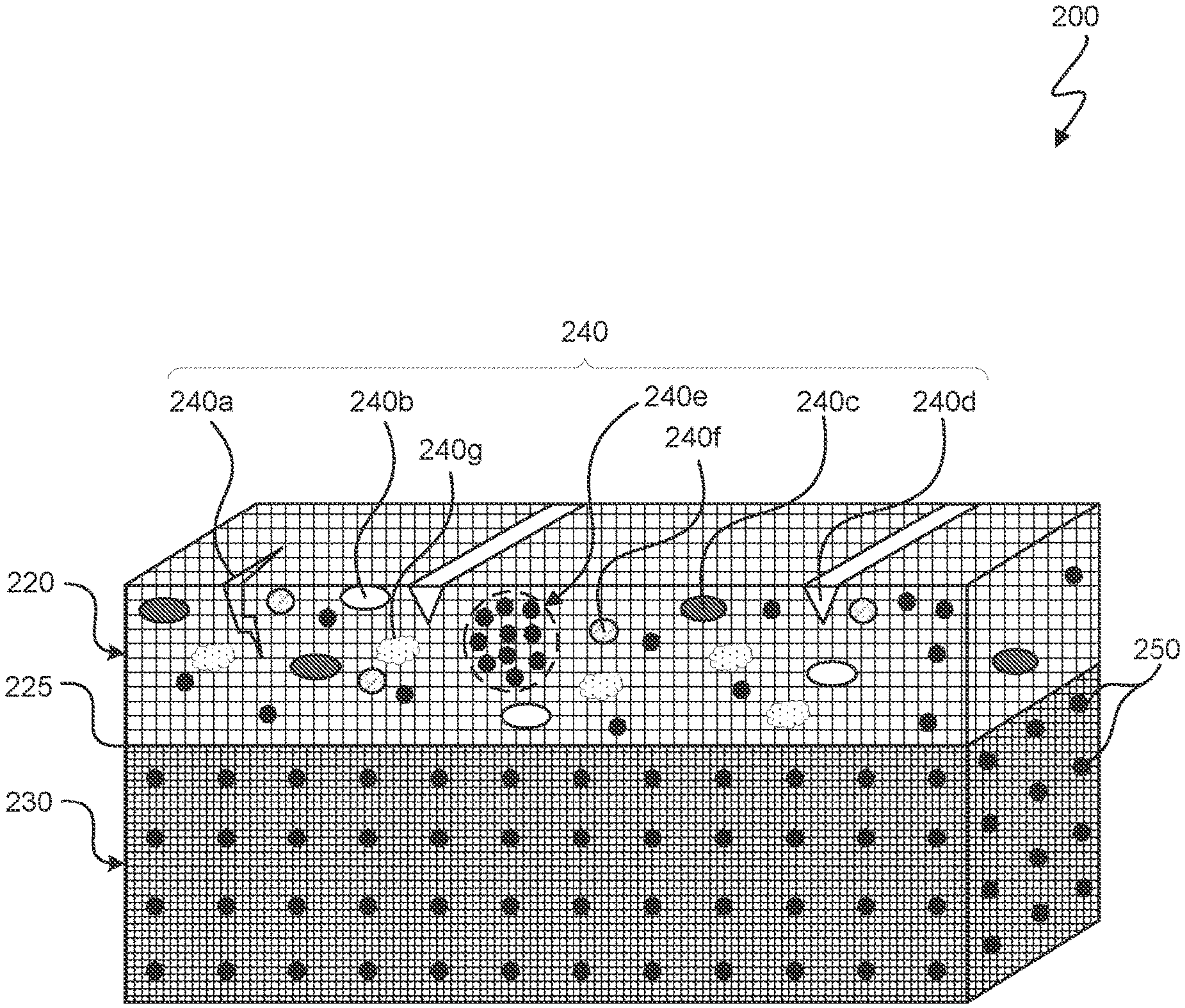
FIG. 2 provides a schematic illustration of a metal alloy product having near-surface microstructures comprising one or more defects.

FIG. 2 schematically illustrates a metal alloy product 200. The metal alloy product 200 may be a plate, a shate, or a sheet, for example. The metal alloy product 200 may comprise or correspond to a rolled product. The rolled product may be a cold-rolled or a hot-rolled product, depending on the casting process and/or the application of the metal alloy product 200. The metal alloy product 200 may be produced by any suitable casting and/or rolling processes as described above. In embodiments, the rolled product may be relatively rectangular in cross-section, having a width and a thickness that may be selected based on the application of the metal alloy product 200. The metal alloy product 200 may be a rolled aluminum alloy product in the form of a plate, shate, or sheet, for example.

The rolled product may include near-surface microstructures 220 and a bulk 230. During rolling processes, generation of near-surface microstructures 220 as part of the rolled product may occur. The near-surface microstructures 220 may occur in a subsurface layer of the rolled product and may occupy a portion or substantially an entirety of the subsurface layer. The subsurface layer, also known as a "surface layer" or a "Beilby layer," may include a portion of the rolled product that occupies a space from the surface of the rolled product to a depth into the thickness of the rolled product. In embodiments, the rolled product may include more than one surface and/or have more than one subsurface layer. In such embodiments, near-surface microstructures 220 may occur in each subsurface layer. For example, the rolled product may have a thickness such that two surfaces are generated: one surface on a top of the rolled product and one surface on a bottom of the rolled product, each surface directly opposed to one other. The other four sides of the rolled product that circumferentially extend about the side of the rolled product may not be thick enough to create a subsurface layer and/or may not be subjected to sufficient rolling processes to generate near-surface microstructures, at least not to the same extent as the top and bottom surfaces. In such an example, each of the two surfaces may have a corresponding subsurface layer. In each of the corresponding subsurface layers, the near-surface microstructures 220 may be present. Accordingly, in various embodiments, the rolled product may have near-surface microstructures 220 on multiple surfaces or in multiple regions on a surface.

In embodiments, the near-surface microstructures 220 may occupy the entire subsurface layer, though in some cases the near-surface microstructures 220 may only occupy portions of subsurface layer. The near-surface microstructures 220 may occupy a space from the surface of the rolled product to a depth into the product down to bulk 230. The depth into the metal alloy product 200 of the near-surface microstructures 220 may range from 200 nm to 400 nm, from 300 nm to 500 nm, from 400 nm to 600 nm, from 200 nm to 600 nm, from 500 nm to 700 nm, from 500 nm to 800 nm, from 200 nm to 800 nm, from 800 nm to 1 μm, from 1 μm to 5 μm, from 5 μm to 10 μm, from 10 μm to 15 μm, from 15 μm to 20 μm, from 200 nm to 20 μm, or any subranges thereof.

A boundary 225 may exist between the near-surface microstructures 220 and the bulk 230. The boundary 225 may indicate the depth at which the composition of the metal alloy product 200 transitions to a composition of the bulk 230, also referred to as a bulk composition. The boundary 225 may exist at the depth to which the near-surface microstructures 220 are present within the metal alloy product 200. The boundary 225 may extend parallel or generally parallel to the surface of the metal alloy product 200 and extend through the entire width of the metal alloy product 200, although it need not. In some embodiments, the boundary 225 may occur at a discrete depth or may occur over a range of depths. In embodiments, the boundary 225 may be, occur at, or represent a grain boundary between the near-surface microstructures 220 and the bulk 230. The grain boundary may be the boundary delineating between two different grain structures, one corresponding to that of the near-surface microstructures 220 and another corresponding to the bulk 230. For example, the near-surface microstructures 220 may have a nonhomogeneous grain structure, such as a nonuniform distribution of both large and small grain sizes. In contrast, the bulk 230 may have a homogenous (e.g., evenly distributed) grain structure, such as a uniform distribution of grain sizes, which may be large or small. In such an example, the boundary 225 may be the grain boundary between the nonhomogeneous grain structure of the near-surface microstructures 220 and the homogenous grain structure of the bulk 230. In embodiments, the bulk 230 may occur at a depth from the surface between 10 μm to 45 μm into the metal alloy product 200, depending on the alloy and processing history. In some cases, a homogenous grain structure may mean that a certain percentage of any given volume of the bulk 230 may have the same or approximately the same grain size. For example, a homogeneous grain structure may mean that approximately 70% or more of any given volume of the bulk 230 has approximately the same grain size, such as an average grain size within a range of 5 nm to 200 nm. The differing grain structure homogeneities may be indicated on FIG. 2, and other figures, by the differing fill patterns for the near-surface microstructures 220 and the bulk 230.

The near-surface microstructures 220 may have a composition that is different from that of the bulk. For example, the composition of the near-surface microstructures 220 may include one or more defects 240*a*-240*g* (collectively, defects 240). The one or more defects 240 may impact the mechanical and/or chemical performance of the aluminum alloy product 212. For example, the one or more defects 240 may increase corrosion sensitivity, reduce the bond durability performance, and/or decrease the tensile and shear strength of the aluminum alloy product 212.

As illustrated in FIG. 2, the one or more defects 240 may include a variety of defects. For example, the defects 240 may include one or more internal cracks 240*a* or surface cracks 240*d*. The internal cracks 240*a* and the surface cracks 240*d* may include transfer cracks, fissures, and microcracks. The internal cracks 240*a* and the surface cracks 240*d* may occur due to stress or strain conditions applied to the rolled product during rolling process, such as vertical shear stress applied to the rolled product by rollers. As illustrated in FIG. 2, the surface cracks 240*d* may occur at the surface of the near-surface microstructures 220, resulting in an uneven or irregular surface. In contrast, the internal cracks 240*a* may occur within the near-surface microstructures 220. In embodiments, the internal cracks 240*a* may extend horizontally through the near-surface microstructures 220, parallel to the surface of the near-surface microstructures 220, or at any other direction relative to the surface of the near-surface microstructures 220.

In embodiments, voids 240*b* may induce development of the internal cracks 240*a* and the surface cracks 240*d*. Weak sites created by the defects 240, such as the voids 240*b*, may provide more active sites for crack initiation. The voids 240*b* may include or consist of spaces within the near-surface microstructures 220 that are empty of any material. The absence of any material may be a result of vapor incorporation into the near-surface microstructures 220 during processing, or may be a result of the mechanical structure and/or the grain composition of the rolled product material.

The one or more defects 240 may also include rolled-in materials 240*c*. The rolled-in materials 240*c* may include hot mill pickups, such as rolled-in oxides and/or rolled-in oils, for example. The rolled-in materials 240*c* may include entrapped oxides and lubricants incorporated into the near-surface microstructures 220 during the rolling process, and optionally other rolled-in impurities. For example, a rolling lubricant may become incorporated in the near-surface microstructures 220 during the rolling of the rolled product 212. Entrapped amorphous carbon and/or aluminum carbide in the near-surface microstructures 220 may indicate or correspond to a rolled-in lubricant. Rolled-in oxides may include metal oxides, such as aluminum oxide or magnesium oxide, for example. Metal oxides may be created when metal elements at or near the surface of the rolled product oxidize during processing and then are incorporated into the rolled product. Rolled-in materials 240*c* may also include other contaminants, such as dust, dirt, water, organics, inorganics, or other material that may be present on or deposited on the surface of metal alloy product 200 or contacting surfaces (e.g., roller surfaces) and incorporated into near-surface microstructures 220, such as during hot rolling or cold rolling.

The presence of the voids 240*b* and/or the rolled-in materials 240*c* near the boundary 225 may induce crack propagation. Weak spots at the boundary 225, such as the voids 240*b* and the rolled-in materials 240*c*, may provide a crack propagation route between the near-surface microstructures 220 and the bulk 230. As such a route between defects may be a preferential crack propagation route, any stress conditions may induce creation of an internal crack 240*a* between the near-surface microstructures 220 and the bulk 230. Stress exposure may result in partial or complete shearing of the near-surface microstructures 220 from the bulk 230. Additionally, any internal cracks 240*a* may nucleate further cracking. Thus, the presence of defects 240 have the potential to create a damaging chain-reaction of defect generation within the near-surface microstructures 220 and possibly into the bulk 230.

In embodiments, the bulk 230 may have a composition referred to herein as a "bulk composition" that may comprise primarily aluminum and alloying elements 250. Exemplary alloying elements 250 for a non-limiting example of aluminum alloy product 200 may include zinc, magnesium, copper, chromium, silicon, iron, and/or manganese and may depend on or define a particular alloy. As illustrated in FIG. 2, the alloying elements 250 may be homogenously (e.g., equally) distributed spatially within the bulk 230. The homogenous distribution of the alloying elements 250 depicted in FIG. 2 may not mean or require that an array of alloying elements 250 occur or that alloying elements 250 are present as particles or agglomerates of materials. Rather, the distribution of alloying elements 250 illustrated in FIG. 2 is meant to be a schematic representation of a homogenous distribution of the alloying elements 250, such as representing a solid solution of aluminum with the alloying elements homogeneously distributed throughout. A homogenous distribution of the alloying elements 250 may mean that a certain percentage of any given volume of the bulk composition may contain the same or substantially the same amount of alloying elements 250 as any other sample of the same volume.

In various embodiments, one of the defects 240 may include a nonhomogeneous distribution of the alloying elements 250. High density populations 240*e* of the alloying elements 250 may occur within the near-surface microstructures 220 during the casting and/or rolling process. Some of the alloying elements 250 may exhibit different diffusion coefficients from one another, resulting in different rates of diffusion for different alloying elements. That is, some of the alloying elements 250 may diffuse at a different rate than another alloying element 250. Thus, during the casting and/or rolling of the rolled product, certain alloying elements may diffuse from the bulk 230 to the surface or into the near-surface microstructures 220 at a faster rate than other elements present within the bulk 230. The faster diffusion rate of certain alloying elements 250 may create an unequal distribution of the alloying elements 250 within the near-surface microstructures 220. For example, in some embodiments, a high density population 240*e* of zinc may occur within the near-surface microstructures 220 because zinc may have a higher diffusion rate under the processing conditions than other alloying elements. Again, it will be appreciated that the high density populations 240*e* shown in FIG. 2 are merely pictorial representations and do not limit high density populations of the alloying elements 250 to a cluster of alloying elements as illustrated, though in some cases clusters of alloying elements 250 may be present. Rather, a presence of high density populations 240*e* in the near-surface microstructures 220 may indicate a concentration of alloying elements in the near-surface microstructures 220 may be, on average, different (e.g., higher) than the bulk 230.

Nonhomogeneous distributions of the alloying elements, as well as other defects 240, may impact the chemical performance of the metal alloy product 212. For example, the presence of defects 240 within the near-surface microstructures 220 may cause incomplete coverage or patchy pretreatment application. The defects 240 may also interfere with etching pretreatments as the defects 240 and the nonhomogeneous distribution of alloying elements 250 may result in an inconsistent medium for the etching process.

The high density populations 240*e* may also or alternatively increase the corrosion sensitivity of the metal alloy product 212. At or near the surface, the diffusion rate of the alloying elements 250 may increase by one or two fold due to low activation energies, as well as the presence of other defects 240. Thus, the high density populations 240*e* may propagate reactive pockets or regions within the near-surface microstructures 220 that have the potential to initiate corrosion. Certain aluminum alloys may be more susceptible to corrosion sensitivity due to the high density populations 240*e* of the alloying elements 250. For example, 7xxx series aluminum alloys may be more susceptible to creation of high density populations 240*e* because of their higher alloying element 250 composition. While other aluminum alloy series may comprise 3-4% alloying elements, a 7xxx series aluminum alloy may comprise upwards of 10% alloying elements, for example.

The one or more defects 240 may also include intermetallic particles 240*f*. During a casting process, aluminum alloy products containing iron (Fe) and manganese (Mn) may generate intermetallic particles 240*f* comprising aluminum and one or more of iron or manganese, which for a rolled aluminum alloy product 212, for example, may be referred to herein as Al—(Fe, Mn) intermetallic particles or β-phase intermetallic particles. When silicon (Si) is present, intermetallic particles comprising aluminum, silicon, and one or more of iron or manganese, also referred to herein as Al—(Fe, Mn)—Si intermetallic particles or α-phase intermetallic particles, may also be generated. As some amounts of iron and silicon are generally present in almost all aluminum alloys, many aluminum alloys may include such intermetallic particles upon casting.

Each of these particle types exhibits different properties and contributes in different ways to the structure of the aluminum alloy. For example, β-phase particles tend to be larger and more blocky or geometric than α-phase particles, while α-phase particles are harder and tend to be smaller than β-phase particles, in general. During hot and cold rolling, intermetallic particles may be broken, impacting their size, distribution, and number density, for example.

The presence of intermetallic particles in a cast aluminum alloy product may be beneficial. For example, aluminum alloys including intermetallic particles can be beneficial for creating aluminum beverage containers since the intermetallic particles may be significantly harder than other portions of the aluminum alloy product. During drawing, ironing, and necking, the hard intermetallic particles can reduce galling by contributing to the cleaning of die surfaces. For example, the intermetallic particles may abrade drawing, ironing, and necking dies and reduce or remove metal built up on the die surfaces. In other metal alloy products, it may be desired to not have intermetallic particles 240*f* in the near-surface microstructures 220.

The one or more defects 240 may also include organics, oils, and hydrocarbons and other contaminants 240*g*. During the casting process and/or the rolling process, organics, oils, and hydrocarbons and other contaminants 240*g* may be introduced to the near-surface microstructures 220 as shown in FIG. 2 and/or the bulk 230. This is due to the lubricants commonly used in the processes associated with making the metal alloy product 200. In metal alloy products, it may be desired to not have organics, oils, and hydrocarbons and other contaminants 240*g* in the near-surface microstructures 220.

The presence of defects 240 may contribute to poor bonding performance, such as when an aluminum alloy product is bonded to another product or material using an adhesive, such as an epoxy adhesive. Bond durability testing assesses the strength of bonds created between the bonded products and may indicate the ability of the near-surface microstructures of an aluminum alloy product to strongly bind with the adhesive over long periods of use and under corrosive conditions or conditions that otherwise differ from ambient conditions. During testing, bonds are created between two aluminum alloy products, such as by an epoxy adhesive. Then, the bonded aluminum alloy products are subjected to strain and/or other conditions. For example, the bonded aluminum alloy products may be immersed in a salt solution, subject to humid conditions, or drying conditions. After a series of cycles in one or more conditions, the bonds between the aluminum alloy products are evaluated for chemical and mechanical failure. The bond durability performance of an aluminum alloy product may indicate or be a function of the reactivity and corrosion sensitivity of the product's near-surface microstructures.

Methods of Using the Disclosed Aluminum Alloy Products

The aluminum alloy products described herein can be used in automotive applications and other transportation applications, including aircraft and railway applications. For example, the disclosed aluminum alloy products can be used to prepare formed metal products and automotive structural parts, such as bumpers, side beams, roof beams, cross beams, pillar reinforcements (e.g., A-pillars, B-pillars, and C-pillars), inner panels, outer panels, side panels, inner hoods, outer hoods, or trunk lid panels. The aluminum alloy products and methods described herein can also be used in aircraft or railway vehicle applications, to prepare, for example, external and internal panels.

The aluminum alloy products and methods described herein can also be used in electronics applications. For example, the aluminum alloy products and methods described herein can be used to prepare housings for electronic devices, including mobile phones and tablet computers. In some examples, the aluminum alloy products can be used to prepare housings for the outer casing of mobile phones (e.g., smart phones), tablet bottom chassis, and other portable electronics.

The aluminum alloy products and methods described herein can be used in any other desired application.

Methods of Treating Metals and Metal Alloys

Described herein are methods of treating metals and metal alloys, including aluminum, aluminum alloys, magnesium, magnesium alloys, magnesium composites, and steel, among others, and the resultant treated metals and metal alloys. In some examples, the metals for use in the methods described herein include aluminum alloys, for example, 1xxx series aluminum alloys, 2xxx series aluminum alloys, 3xxx series aluminum alloys, 4xxx series aluminum alloys, 5xxx series aluminum alloys, 6xxx series aluminum alloys, 7xxx series aluminum alloys, or 8xxx series aluminum alloys. In some examples, the materials for use in the methods described herein include non-ferrous materials, including aluminum, aluminum alloys, magnesium, magnesium-based materials, magnesium alloys, magnesium composites, titanium, titanium-based materials, titanium alloys, copper, copper-based materials, composites, sheets used in composites, or any other suitable metal, non-metal or combination of materials. Monolithic as well as non-monolithic, such as roll-bonded materials, cladded alloys, clad layers, composite materials, such as but not limited to carbon fiber-containing materials, or various other materials are also useful with the methods described herein. In some examples, aluminum alloys containing iron are useful with the methods described herein.

By way of non-limiting example, exemplary 1xxx series aluminum alloys for use in the methods described herein can include AA1100, AA1100A, AA1200, AA1200A, AA1300, AA1110, AA1120, AA1230, AA1230A, AA1235, AA1435, AA1145, AA1345, AA1445, AA1150, AA1350, AA1350A, AA1450, AA1370, AA1275, AA1185, AA1285, AA1385, AA1188, AA1190, AA1290, AA1193, AA1198, or AA1199.

Non-limiting exemplary 2xxx series aluminum alloys for use in the methods described herein can include AA2001, A2002, AA2004, AA2005, AA2006, AA2007, AA2007A, AA2007B, AA2008, AA2009, AA2010, AA2011, AA2011A, AA2111, AA2111A, AA2111B, AA2012, AA2013, AA2014, AA2014A, AA2214, AA2015, AA2016, AA2017, AA2017A, AA2117, AA2018, AA2218, AA2618, AA2618A, AA2219, AA2319, AA2419, AA2519, AA2021, AA2022, AA2023, AA2024, AA2024A, AA2124, AA2224, AA2224A, AA2324, AA2424, AA2524, AA2624, AA2724, AA2824, AA2025, AA2026, AA2027, AA2028, AA2028A, AA2028B, AA2028C, AA2029, AA2030, AA2031, AA2032, AA2034, AA2036, AA2037, AA2038, AA2039, AA2139, AA2040, AA2041, AA2044, AA2045, AA2050, AA2055, AA2056, AA2060, AA2065, AA2070, AA2076, AA2090, AA2091, AA2094, AA2095, AA2195, AA2295, AA2196, AA2296, AA2097, AA2197, AA2297, AA2397, AA2098, AA2198, AA2099, or AA2199.

Non-limiting exemplary 3xxx series aluminum alloys for use in the methods described herein can include AA3002, AA3102, AA3003, AA3103, AA3103A, AA3103B, AA3203, AA3403, AA3004, AA3004A, AA3104, AA3204, AA3304, AA3005, AA3005A, AA3105, AA3105A, AA3105B, AA3007, AA3107, AA3207, AA3207A, AA3307, AA3009, AA3010, AA3110, AA3011, AA3012, AA3012A, AA3013, AA3014, AA3015, AA3016, AA3017, AA3019, AA3020, AA3021, AA3025, AA3026, AA3030, AA3130, or AA3065.

Non-limiting exemplary 4xxx series aluminum alloys for use in the methods described herein can include AA4004, AA4104, AA4006, AA4007, AA4008, AA4009, AA4010, AA4013, AA4014, AA4015, AA4015A, AA4115, AA4016, AA4017, AA4018, AA4019, AA4020, AA4021, AA4026, AA4032, AA4043, AA4043A, AA4143, AA4343, AA4643, AA4943, AA4044, AA4045, AA4145, AA4145A, AA4046, AA4047, AA4047A, or AA4147.

Non-limiting exemplary 5xxx series aluminum alloys for use in the methods described herein can include AA5182, AA5183, AA5005, AA5005A, AA5205, AA5305, AA5505, AA5605, AA5006, AA5106, AA5010, AA5110, AA5110A, AA5210, AA5310, AA5016, AA5017, AA5018, AA5018A, AA5019, AA5019A, AA5119, AA5119A, AA5021, AA5022, AA5023, AA5024, AA5026, AA5027, AA5028, AA5040, AA5140, AA5041, AA5042, AA5043, AA5049, AA5149, AA5249, AA5349, AA5449, AA5449A, AA5050, AA5050A, AA5050C, AA5150, AA5051, AA5051A, AA5151, AA5251, AA5251A, AA5351, AA5451, AA5052, AA5252, AA5352, AA5154, AA5154A, AA5154B, AA5154C, AA5254, AA5354, AA5454, AA5554, AA5654, AA5654A, AA5754, AA5854, AA5954, AA5056, AA5356, AA5356A, AA5456, AA5456A, AA5456B, AA5556, AA5556A, AA5556B, AA5556C, AA5257, AA5457, AA5557, AA5657, AA5058, AA5059, AA5070, AA5180, AA5180A, AA5082, AA5182, AA5083, AA5183, AA5183A, AA5283, AA5283A, AA5283B, AA5383, AA5483, AA5086, AA5186, AA5087, AA5187, or AA5088.

Non-limiting exemplary 6xxx series aluminum alloys for use in the methods described herein can include AA6101, AA6101A, AA6101B, AA6201, AA6201A, AA6401, AA6501, AA6002, AA6003, AA6103, AA6005, AA6005A, AA6005B, AA6005C, AA6105, AA6205, AA6305, AA6006, AA6106, AA6206, AA6306, AA6008, AA6009, AA6010, AA6110, AA6110A, AA6011, AA6111, AA6012, AA6012A, AA6013, AA6113, AA6014, AA6015, AA6016, AA6016A, AA6116, AA6018, AA6019, AA6020, AA6021, AA6022, AA6023, AA6024, AA6025, AA6026, AA6027, AA6028, AA6031, AA6032, AA6033, AA6040, AA6041, AA6042, AA6043, AA6151, AA6351, AA6351A, AA6451, AA6951, AA6053, AA6055, AA6056, AA6156, AA6060, AA6160, AA6260, AA6360, AA6460, AA6460B, AA6560, AA6660, AA6061, AA6061A, AA6261, AA6361, AA6162, AA6262, AA6262A, AA6063, AA6063A, AA6463, AA6463A, AA6763, A6963, AA6064, AA6064A, AA6065, AA6066, AA6068, AA6069, AA6070, AA6081, AA6181, AA6181A, AA6082, AA6082A, AA6182, AA6091, or AA6092.

Non-limiting exemplary 7xxx series aluminum alloys for use in the methods described herein can include AA7011, AA7019, AA7020, AA7021, AA7039, AA7072, AA7075, AA7085, AA7108, AA7108A, AA7015, AA7017, AA7018, AA7019A, AA7024, AA7025, AA7028, AA7030, AA7031, AA7033, AA7035, AA7035A, AA7046, AA7046A, AA7003, AA7004, AA7005, AA7009, AA7010, AA7011, AA7012, AA7014, AA7016, AA7116, AA7122, AA7023, AA7026, AA7029, AA7129, AA7229, AA7032, AA7033, AA7034, AA7036, AA7136, AA7037, AA7040, AA7140, AA7041, AA7049, AA7049A, AA7149,7204, AA7249, AA7349, AA7449, AA7050, AA7050A, AA7150, AA7250, AA7055, AA7155, AA7255, AA7056, AA7060, AA7064, AA7065, AA7068, AA7168, AA7175, AA7475, AA7076, AA7178, AA7278, AA7278A, AA7081, AA7181, AA7185, AA7090, AA7093, AA7095, or AA7099.

Non-limiting exemplary 8xxx series aluminum alloys for use in the methods described herein can include AA8005, AA8006, AA8007, AA8008, AA8010, AA8011, AA8011A, AA8111, AA8211, AA8112, AA8014, AA8015, AA8016, AA8017, AA8018, AA8019, AA8021, AA8021A, AA8021B, AA8022, AA8023, AA8024, AA8025, AA8026, AA8030, AA8130, AA8040, AA8050, AA8150, AA8076, AA8076A, AA8176, AA8077, AA8177, AA8079, AA8090, AA8091, or AA8093.

Methods according to the present disclosure modify the surface of aluminum alloy products, such as to remove or alter near-surface microstructures present on the surface, without the use of standard techniques such as chemical or wet etching techniques, conversion coatings, dry cleaning processes including any mechanical surface preparation such as micro-blasting, macro-blasting, carbon dioxide dry ice impact and blasting, or any combination thereof. Advantageously, the disclosed methods may generate surfaces on aluminum alloy products that are modified, such as cleaned and/or activated, for use and exhibit good coating deposition and adhesion, paint adhesion, highly durable adhesive bonding, or the like. Further, the disclosed methods may achieve such conditions without using wet sections commonly used for chemical etching, cleaning, and/or conversion coatings, allowing aluminum alloy product processing to be simplified and also reduce or eliminate use of undesirable, expensive, and/or, in some cases, hazardous or toxic chemicals. In some cases, wet sections commonly used for chemical etching, cleaning, mechanical surface preparation, and/or conversion coatings may still be utilized. In some cases, only dry processing or chemical pretreatment-free techniques are utilized.

Figure 3A:
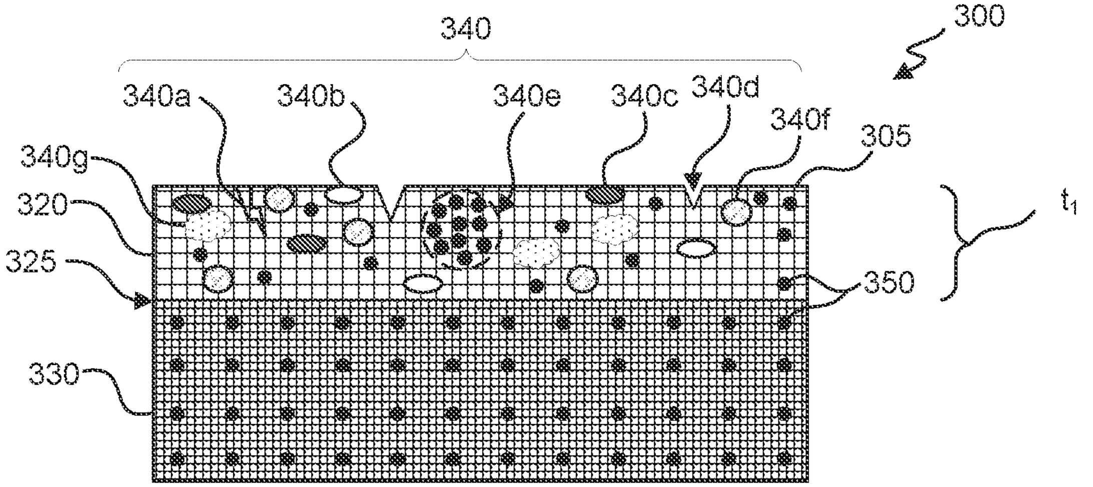
FIG. 3A provides a schematic illustration of a cross-section of a metal alloy product having an untreated surface and near-surface microstructures comprising one or more defects.
Figure 3B:
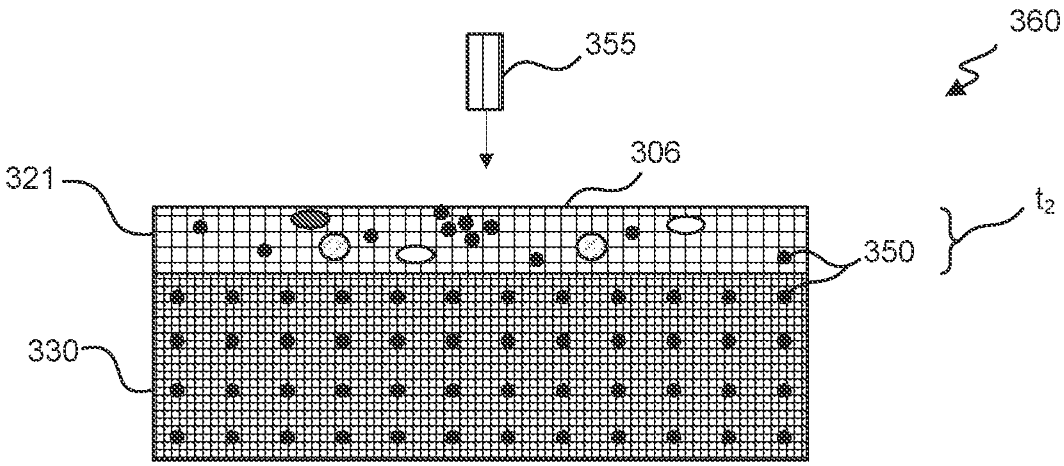
FIG. 3B provides a schematic illustration of the cross-section shown in FIG. 3A having a beam of high energy directed onto the surface to affect the near-surface microstructures and to provide a cleaned surface.
Figure 3C:
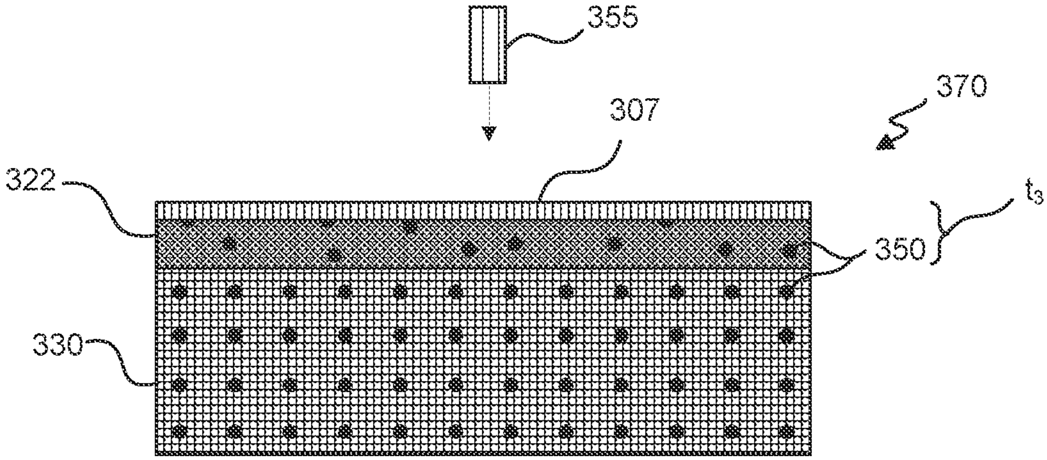
FIG. 3C provides a schematic illustration of the cross-section shown in FIG. 3B having a beam of high energy directed onto the cleaned surface to affect the near-surface microstructures and to provide a textured surface.

FIGS. 3A-3C illustrate a method of modifying near-surface microstructures present on a metal alloy substrate 300. Substrate 300 may be a metal alloy product as described above, such as a rolled aluminum alloy product. In FIG. 3, substrate 300 has near-surface microstructures 320 and a bulk microstructure 330, as similarly described for near-surface microstructures 220 and bulk 230, respectively, as in FIG. 2. The near-surface microstructures 320 include an untreated surface 305. An untreated surface may correspond to a rolled surface that has not undergone any surface treatment or modification including, but not limited to, chemical or wet etching techniques, mechanical surface preparation techniques, and/or pretreatment (e.g., conversion coating) techniques. In some embodiments, at least one surface 305, or some exposed surfaces, or all of the exposed surfaces of substrate 300, are untreated. The near-surface microstructures 320 of substrate 300 include at least some of the defects 340*a*-340*g* as shown in FIG. 3A, similar to defects 240*a*-240*g* described with respect to FIG. 2.

A beam of high energy 355, as shown in FIG. 3B, is directed onto the untreated surface 305 (of FIG. 3A) to physically modify the surface 305 and provide a cleaned surface 306 devoid of at least some of the defects 340. In embodiments, the cleaned surface 306 may still include near-surface microstructures 321 but be substantially devoid of defects 340. Specifically, the cleaned surface 306 may be substantially devoid of organics, oils, and hydrocarbons 340*g*, for example.

Near-surface microstructures 320 of FIG. 3A have a thickness $t_1$. Near-surface microstructures 321 of FIG. 3B have a thickness $t_2$. The beam of high energy 355 may remove at least a portion of the near-surface microstructures 320. In other words, after directing the beam of high energy 355 onto the untreated surface 305, the thickness $t_2$ of the near-surface microstructures 321 associated with cleaned surface 306 may be reduced relative to the thickness $t_1$ of the near-surface microstructures 320 associated with untreated surface 305.

The beam of high energy 355 may be directed onto the cleaned surface 306 (of FIG. 3B) to further modify the surface to provide a textured surface 307 as shown in FIG. 3C. Near-surface microstructures 322 together with the textured surface 307 of FIG. 3C have a thickness $t_3$. After directing the beam of high energy 355 onto the cleaned surface 306, the thickness $t_3$ of the near-surface microstructures 322 associated with textured surface 307 may be further reduced relative to the thickness $t_2$ of the near-surface microstructures 321 associated with cleaned surface 306. Optionally, the near surface microstructures 322 may be completely removed or modified, such as to provide a thickness $t_3$ of zero, such that bulk 330 may be exposed as the top surface and may comprise or be associated with textured surface 307. In some embodiments, thickness $t_3$<thickness $t_2$<thickness $t_1$. The textured surface 307 may include at least one of meshes, stripes, wavy lines, pit grooves, surface asperities of texture elements, or combinations thereof. Variables to modify/optimize textured surface 307 may include laser parameters such as spot size, overlap, beam energy, raster pattern, raster speed, and pulse frequency. Textures may be defined by Sa (3D surface roughness measurement), Sdr (complexity defined as the ratio between the area of the actual developed surface to the projected surface area or developed interfacial area ratio), Spk (3D surface peak height measurement), Spc peak count, Sv or Sz (depth of texturing), skewness, or the like.

Advantageously, modifying the surface 305 to generate a cleaned surface 306 or textured surface 307 by exposure to beam of high energy 355 may change a wettability character of the surface from relatively less wettable to relatively more wettable. Additionally or alternatively, modifying the surface 305 to generate a cleaned surface 306 or a textured surface 307 by exposure to beam of high energy 355 may strengthen the bonding of an adhesive to the surface from a relatively weaker bond to a relatively stronger bond. Additionally or alternatively, modifying the surface 305 to generate a cleaned surface 306 or textured surface 307 by exposure to beam of high energy 355 may decrease the corrosion potential of the surface from a relatively more corrosively active level to a relatively less corrosively active level. Additionally or alternatively, modifying the surface 305 to generate a cleaned surface 306 or textured surface 307 by exposure to beam of high energy 355 may reduce a corrosion potential of the surface from a relatively higher corrosion potential to a relatively lower corrosion potential. Additionally or alternatively, modifying the surface 305 to generate a cleaned surface 306 or textured surface 307 by exposure to beam of high energy 355 may change a bond durability of a bond between the surface and another product from a relatively smaller bond durability to a relatively larger or higher performing bond durability. In embodiments, the textured surface 307 as in FIG. 3C may exhibit a bond durability of at least 35 cycles, or at least 40 cycles, or at least 45 cycles, or at least 50 cycles, or at least 55 cycles, or at least 60 cycles, or at least 65 cycles, or at least 70 cycles, or at least 75 cycles, or at least 80 cycles, or at least 85 cycles, or at least 90 cycles, or at least 95 cycles, or at least 100 cycles, or at least 105 cycles, or at least 110 cycles, or at least 115 cycles, or at least 120 cycles, or at least 125 cycles, or more, such as according to a FLTM BV 101-07 standard test or other standard test.

Substrate 300 may include non-ferrous materials, including aluminum, aluminum alloys, magnesium, magnesium-based materials, magnesium alloys, magnesium composites, titanium, titanium-based materials, titanium alloys, copper, copper-based materials, composites, sheets used in composites, or any other suitable metal, non-metal or combination of materials, depending on the particular alloy or metals used. In some embodiments, substrate 300 comprises an aluminum alloy, a magnesium alloy, a magnesium composite, steel, or any combination thereof. In some embodiments, substrate 400 is an aluminum alloy. Useful aluminum alloys include any of those detailed previously, for example, 1xxx series aluminum alloys, 2xxx series aluminum alloys, 3xxx series aluminum alloys, 4xxx series aluminum alloys, 5xxx series aluminum alloys, 6xxx series aluminum alloys, 7xxx series aluminum alloys, or 8xxx series aluminum alloys.

The beam of high energy 355, as in FIGS. 3B and 3C, may be provided by a laser. The laser may be at least one chosen from a continuous laser, a pulsed laser, a nanosecond pulsed laser, a picosecond pulsed laser, and/or a femtosecond pulsed laser. The laser may be at least one chosen from ytterbium, Nd-YAG, $CO_2$, or excimer, or may be any suitable laser providing the desired energy density.

The beam of high energy 355, as in FIGS. 3B and 3C, may have an energy density of from 10 $mJ/mm^2$ to 150 $mJ/mm^2$, for example. The energy density may optionally range from 10 $mJ/mm^2$ to 30 $mJ/mm^2$, from 20 $mJ/mm^2$ to 40 $mJ/mm^2$, from 30 $mJ/mm^2$ to 50 $mJ/mm^2$, from 40 $mJ/mm^2$ to 60 $mJ/mm^2$, from 50 $mJ/mm^2$ to 70 $mJ/mm^2$, from 60 $mJ/mm^2$ to 80 $mJ/mm^2$, from 70 $mJ/mm^2$ to 90 $mJ/mm^2$, from 80 $mJ/mm^2$ to 100 $mJ/mm^2$, from 90 $mJ/mm^2$ to 110 $mJ/mm^2$, from 100 $mJ/mm^2$ to 120 $mJ/mm^2$, from 110 $mJ/mm^2$ to 130 $mJ/mm^2$, from 120 $mJ/mm^2$ to 140 $mJ/mm^2$, from 130 $mJ/mm^2$ to 150 $mJ/mm^2$, or any subranges thereof.

A contact angle between the surface and a liquid, such as water, a liquid adhesive, or an organic or inorganic lubricant may be determined and may optionally vary based on the energy density of the beam of energy used to treat the surface, such as to evaluate wettability. Contact angles referred to herein are generally expressed in terms of the contact angle of water with a surface. In some cases, the contact angle decreases relative to the original surface with increasing energy density of the beam of high energy. For example, an original substrate may have a contact angle of about 75 degrees, and this angle may decrease as the surface is treated by exposure to a beam of high energy, such as laser light. A lower contact angle reflects improved surface wettability and may also reflect an improvement in bonding durability characteristics for bonding the modified surface with another substrate or product. In embodiments, the energy density of the beam of high energy is sufficient to reduce a contact angle of the surface upon exposure to the beam of high energy. In some embodiments, the contact angle of the modified surface is at most 20 degrees, at most 15 degrees, or at most 10 degrees. In some embodiments, the contact angle of the textured surface is at most 20 degrees, at most 15 degrees, or at most 10 degrees. Optionally, the contact angle of a drop of water with the surface may be from 0 degrees to 20 degrees, such as from 0 degrees to 5 degrees, from 0 degrees to 10 degrees, from 0 degrees to 15 degrees, from 5 degrees to 10 degrees, from 5 degrees to 15 degrees, from 5 degrees to 20 degrees, from 10 degrees to 15 degrees, from 10 to 20 degrees, or from 15 to 20 degrees, or anywhere in between.

Figure 4A:
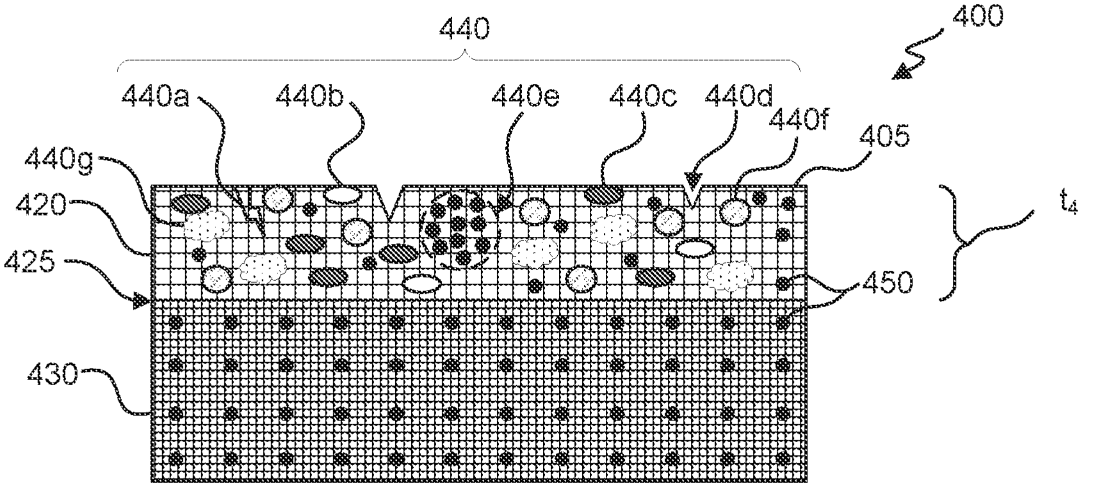
FIG. 4A provides a schematic illustration of a cross-section of a metal alloy product having an untreated surface and near-surface microstructures comprising one or more defects including metal oxide particles and intermetallic particles.
Figure 4B:
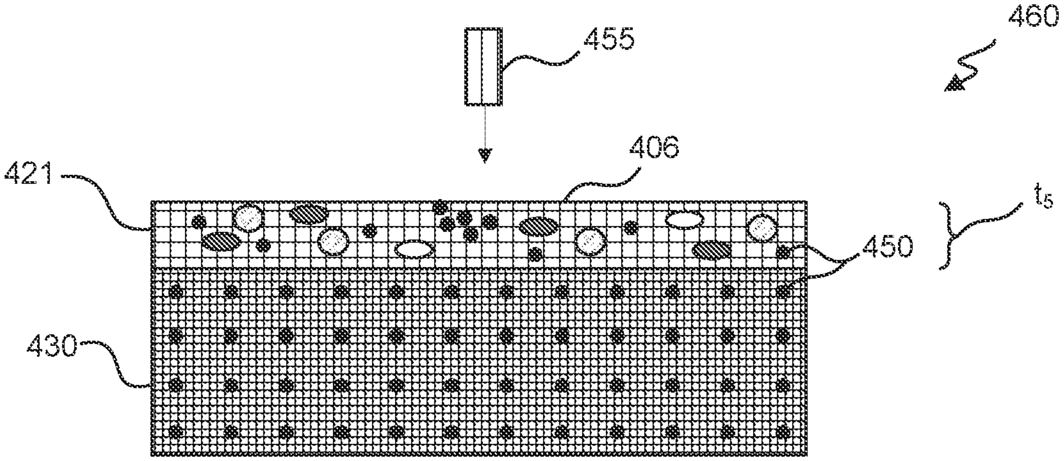
FIG. 4B provides a schematic illustration of the cross-section shown in FIG. 4A having a beam of high energy directed onto the untreated surface to affect the near-surface microstructures and to provide a cleaned surface.
Figure 4C:
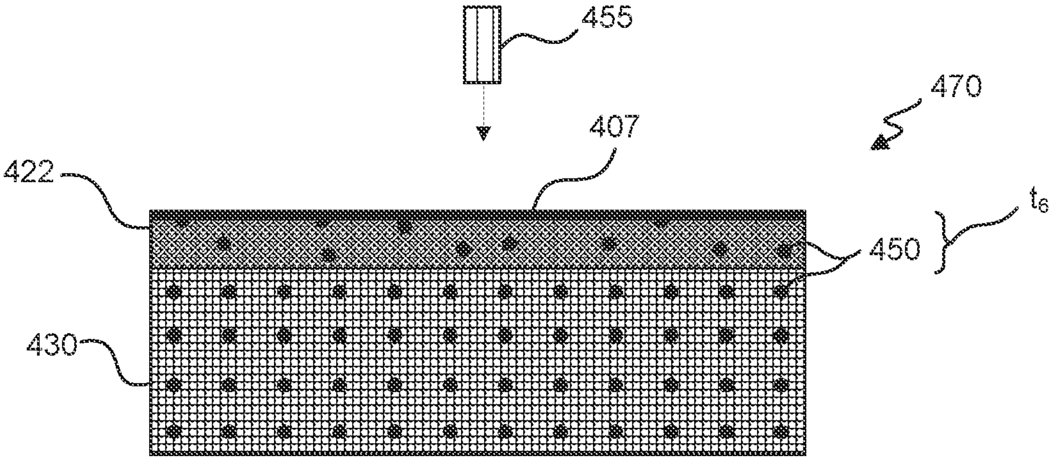
FIG. 4C provides a schematic illustration of the cross-section shown in FIG. 4B having a beam of high energy directed onto the cleaned surface to affect the near-surface microstructures and to provide an activated surface free of metal oxide particles and intermetallic particles.

Another method according to the present disclosure modifies the near-surface microstructures without the use of chemical or wet etching techniques, mechanical surface preparation techniques, and/or conversion coatings. FIGS. 4A-4C illustrate a method of modifying near-surface microstructures. As shown in FIG. 4A, a metal alloy substrate 400 is provided. Substrate 400 may be a metal alloy product as described previously, such as an aluminum alloy product. Substrate 400 has near-surface microstructures 420 and a bulk microstructure 430, as similarly described with respect to FIG. 2 and FIG. 3A. The near-surface microstructures 420 includes an untreated surface 405. Untreated surface 405 has not undergone any surface treatment or modification including, but not limited to, chemical or wet etching techniques, mechanical surface preparation techniques, and/or conversion coatings. In some embodiments, at least one surface 405, or some exposed surfaces, or all of the exposed surfaces of substrate 400, are untreated. The near-surface microstructures 420 of substrate 400 includes at least some of the defects 440*a*-440*g* as shown in FIG. 4A, similar to defects 240*a*-240*g* described with respect to FIG. 2. As shown in FIG. 4A, near-surface microstructures 420 includes defects 440. Defects 440 include rolled-in materials including a plurality of metal oxides 440*c*, a plurality of intermetallic particles 440*f*, and organics, oils, and hydrocarbons 440*g*. Defects 440 may also include defects including internal cracks 440*a*, voids 440*b*, surface cracks 440*d*, and high density populations of alloying elements 440*e*.

A beam of high energy 455, as shown in FIG. 4B, is directed onto the untreated surface 405 (of FIG. 4A) to physically modify the surface to provide a cleaned surface 406 devoid of at least some of the defects 440. In embodiments, the cleaned surface 406 may still include near-surface microstructures 421 but be substantially devoid of defects 440*g*. Specifically, the cleaned surface 406 may be substantially devoid of organics, oils, and hydrocarbons 440*g*.

Near-surface microstructures 420 of FIG. 4A have a thickness $t_4$. Near-surface microstructures 421 of FIG. 4B have a thickness $t_5$. The beam of high energy 455 may remove at least a portion of the near-surface microstructures 420. In other words, after directing the beam of high energy 455 onto the untreated surface 405, the thickness $t_5$ of the near-surface microstructures 420 associated with cleaned surface 406 may be reduced relative to the thickness $t_4$ of the near-surface microstructures 420 associated with untreated surface 405.

The beam of high energy 455 may be directed onto the cleaned surface 406 (of FIG. 4B) to further modify the surface to provide an activated surface 407 as shown in FIG. 4C, optionally having near-surface microstructures 422. The beam of high energy directed onto the cleaned surface 406 affects the near-surface microstructures through melting at least one of the plurality of metal oxides 440*c* and the plurality of intermetallic particles 440*f*. The melted particles may be incorporated into the bulk composition. Activated surface 407 associated with near-surface microstructures 422 is substantially devoid of at least one of the plurality of metal oxides 440*c* and the plurality of intermetallic particles 440*f*. In embodiments, activated surface 407 associated with near-surface microstructures 422 is substantially devoid of metal oxides 440*c* and intermetallic particles 440*f*. In embodiments, the near-surface microstructures 422 together with the activated surface 407 of FIG. 4C have a thickness $t_6$. After directing the beam of high energy 455 onto the cleaned surface 406, the thickness $t_6$ of the near-surface microstructures 422 associated with activated surface 407 may be further reduced relative to the thickness $t_5$ of the near-surface microstructures 421 associated with cleaned surface 406. Optionally, the near surface microstructures 420, 421, 422 may be completely removed or modified, such as to provide a thickness $t_6$ of zero, such that bulk 430 may be exposed as the top surface and may comprise or be associated with activated surface 407. In some embodiments, thickness $t_6$<thickness $t_5$<thickness $t_4$. In embodiments, the near-surface microstructures are removed up to a depth of about 10 μm. In other embodiments, the near-surface microstructures are removed up to a depth of about 5 μm. In other words, the thickness $t_6$ is less than the thickness $t_4$ by up to about 10 μm, or up to about 5 μm, as a result of directing beam of high energy 455 onto the surface of the substrate.

Advantageously, modifying the surface 405 to generate a cleaned surface 406 or activated surface 407 by exposure to beam of high energy 455 may change a wettability character of the surface from relatively less wettable to relatively more wettable. Additionally or alternatively, modifying the surface 405 to generate a cleaned surface 406 or activated surface 407 by exposure to beam of high energy 455 may strengthen the bonding of an adhesive to the surface from a relatively weaker bond to a relatively stronger bond. Additionally or alternatively, modifying the surface 405 to generate a cleaned surface 406 or activated surface 407 by exposure to beam of high energy 455 may decrease the corrosion potential of the surface from a relatively more corrosively active level to a relatively less corrosively active level. Additionally or alternatively, modifying the surface 405 to generate a cleaned surface 406 or activated surface 407 by exposure to beam of high energy 455 may reduce a corrosion potential of the surface from a relatively higher corrosion potential to a relatively lower corrosion potential to make the surface electrochemically more noble. Additionally or alternatively, modifying the surface 405 to generate a cleaned surface 406 or activated surface 407 by exposure to beam of high energy 455 may change a bond durability of a bond between the surface and another product from a relatively smaller bond durability to a relatively larger or higher performing bond durability. In embodiments, the activated surface 407 as in FIG. 4C may exhibit a bond durability of at least 35 cycles, or at least 40 cycles, or at least 45 cycles, or at least 50 cycles, or at least 55 cycles, or at least 60 cycles, or at least 65 cycles, or at least 70 cycles, or at least 75 cycles, or at least 80 cycles, or at least 85 cycles, or at least 90 cycles, or at least 95 cycles, or at least 100 cycles, or at least 105 cycles, or at least 110 cycles, or at least 115 cycles, or at least 120 cycles, or at least 125 cycles, or more, such as according to a FLTM BV 101-07 standard test or other standard test.

Substrate 400 may include non-ferrous materials, including aluminum, aluminum alloys, magnesium, magnesium-based materials, magnesium alloys, magnesium composites, titanium, titanium-based materials, titanium alloys, copper, copper-based materials, composites, sheets used in composites, or any other suitable metal, non-metal or combination of materials, depending on the particular alloy or metals used. In some embodiments, substrate 400 comprises an aluminum alloy, a magnesium, magnesium alloy, a magnesium composites, steel, or any combination thereof. In some embodiments, substrate 400 is an aluminum alloy. Useful aluminum alloys include any of those detailed previously, for example, 1xxx series aluminum alloys, 2xxx series aluminum alloys, 3xxx series aluminum alloys, 4xxx series aluminum alloys, 5xxx series aluminum alloys, 6xxx series aluminum alloys, 7xxx series aluminum alloys, or 8xxx series aluminum alloys.

The beam of high energy 455, as in FIGS. 4B and 4C, may be provided by a laser. The laser may be at least one chosen from a continuous laser, a pulsed laser, a nanosecond pulsed laser, a picosecond pulsed laser, or a femtosecond pulsed laser. The laser may be at least one chosen from ytterbium, Nd-YAG, $CO_2$, and excimer, or may be any suitable laser providing the desired energy density. The laser may have any suitable wavelength, such as from about 200 nm to about 1500 nm. Treatment by a laser may, in some cases, be referred to as laser ablation treatment.

The beam of high energy 455, as in FIGS. 4B and 4C, may have an energy density in the range from at least 10 mJ/mm$^2$ to at most 200 mJ/mm$^2$. The energy density may range from 10 mJ/mm$^2$ to 30 mJ/mm$^2$, from 20 mJ/mm$^2$ to 40 mJ/mm$^2$, from 30 mJ/mm$^2$ to 50 mJ/mm$^2$, from 40 mJ/mm$^2$ to 60 mJ/mm$^2$, from 50 mJ/mm$^2$ to 70 mJ/mm$^2$, from 60 mJ/mm$^2$ to 80 mJ/mm$^2$, from 70 mJ/mm$^2$ to 90 mJ/mm$^2$, from 80 mJ/mm$^2$ to 100 mJ/mm$^2$, from 90 mJ/mm$^2$ to 110 mJ/mm$^2$, from 100 mJ/mm$^2$ to 120 mJ/mm$^2$, from 110 mJ/mm$^2$ to 130 mJ/mm$^2$, from 120 mJ/mm$^2$ to 140 mJ/mm$^2$, from 130 mJ/mm$^2$ to 150 mJ/mm$^2$, from 140 mJ/mm$^2$ to 160 mJ/mm$^2$, from 150 mJ/mm$^2$ to 170 mJ/mm$^2$, from 160 mJ/mm$^2$ to 180 mJ/mm$^2$, from 170 mJ/mm$^2$ to 190 mJ/mm$^2$, from 180 mJ/mm$^2$ to 200 mJ/mm$^2$, or any subranges thereof. In embodiments, the beam of high energy may have a power in the range from at least 7 W to at most 1000 W. The beam of high energy power may range from 7 W to 100 W, from 50 W to 150 W, from 100 W to 200 W, from 150 W to 250 W, from 200 W to 300 W, from 250 W to 350 W, from 300 W to 400 W, from 350 W to 450 W, from 400 W to 500 W, from 450 W to 550 W, from 500 W to 600 W, from 550 W to 650 W, from 600 W to 700 W, from 650 W to 750 W, from 700 W to 800 W, from 750 W to 850 W, from 800 W to 900 W, from 850 W to 950 W, from 900 W to 1000 W, or any subranges thereof. In some embodiments, the beam of high energy power is about 300 W.

Figure 5:
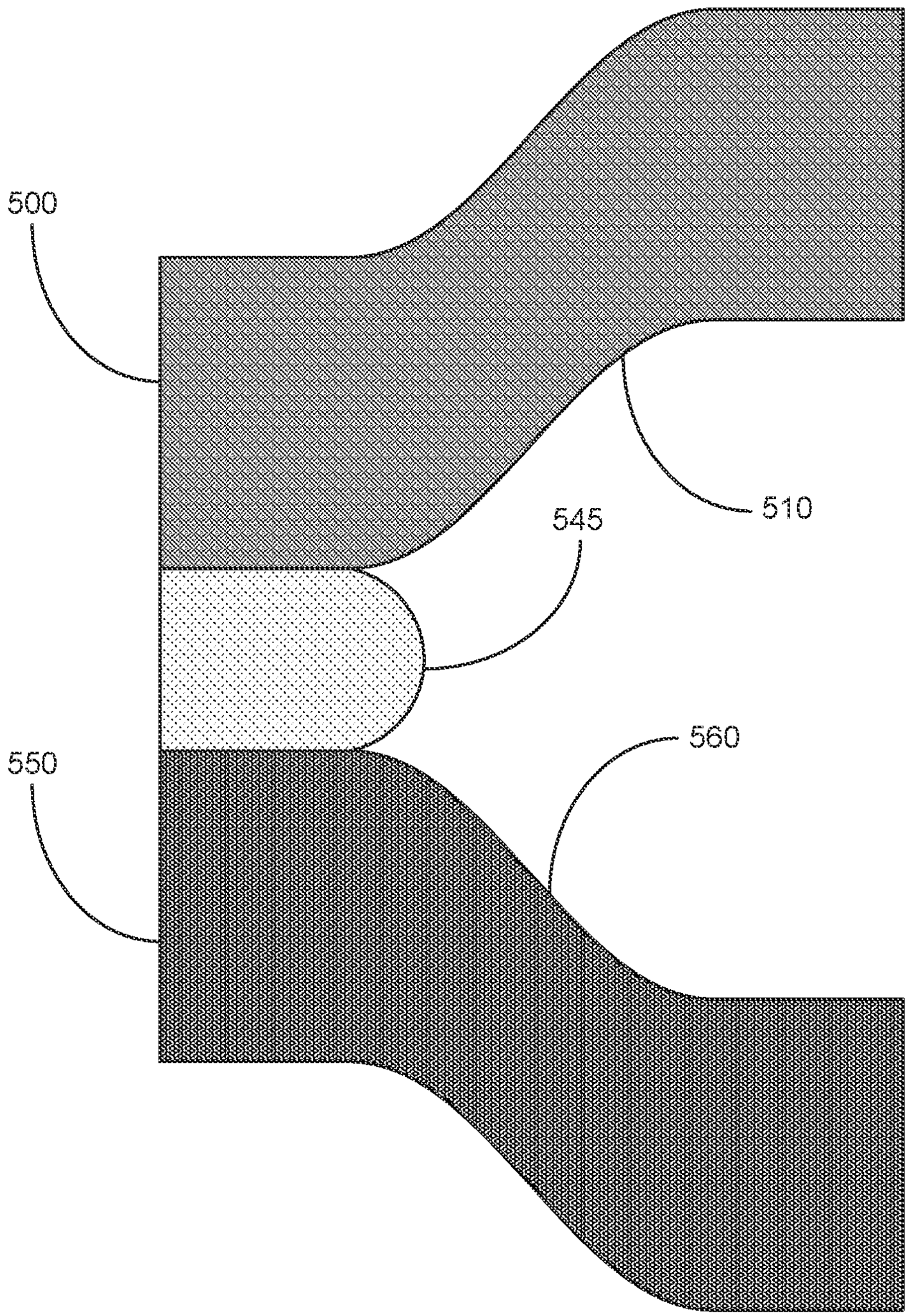
FIG. 5 provides a schematic illustration of a formed metal alloy product, the product having a modified surface and joined to another product by an adhesive.

FIG. 5 provides a schematic illustration of a metal alloy product 500 in which surface has been modified according to the methods disclosed above, such as to provide a modified surface, such as a cleaned surface, a textured surface, or an activated surface, for example. As illustrated, a first product 500 is a formed metal alloy product having a surface 510. Surface 510 may be similar to any one of the cleaned surfaces, textured surfaces, or activated surfaces described above. A second product 550 having surface 560 may optionally comprise another material and surface 560 may or may not be an untreated surface, modified surface, cleaned surface, textured surface, or activated surface. Although metal alloy product 500 and second product 550 are shown in formed configurations in FIG. 5, one or both of metal alloy product 500 and second product 550 may optionally be in an unformed (e.g., planar) configuration. Advantageously, adhesive 545 may strongly bind surface 510 to surface 560 and provide for a high-strength joint between metal alloy product 500 and second product 550. Example adhesives useful for joining a metal alloy product to another product may include epoxy adhesives, acrylate adhesives, phenolic adhesives, and polyurethane adhesives, or the like.

The surfaces according to the present disclosure, namely cleaned surface 306, textured surface 307, and activated surface 407, may be bonding surfaces as represented by surface 510 in FIG. 5. A bonding surface advantageously does not require immediate bonding to another surface, substrate, or product, and may be characterized by a surface stability or wait period corresponding to a time duration during which the bonding surface can be bonded to another product using an adhesive and the resultant bonded product will exhibit a high bond durability, such as exhibiting a bonding durability of at least 45 cycles when subjected to a bond durability test according to a FLTM BV 101-07 standard test, Stress Durability Test for Adhesive Lap-Sear Bonds (2017), which is hereby incorporated by reference, or some other standard test. As such, the bonding surface may be associated with a wait period before being bonded to another surface, substrate, or product. For Example surface stability and/or wait periods may be from 1 minute to 6 months, such as 1 hour, 2 hours, 3 hours, 4 hours, 5 hours, 6, hours, 7 hours, 8 hours, 9 hours, 10 hours, 11 hours, 12 hours, 13 hours, 14 hours, 15 hours, 16 hours, 17 hours, 18 hours, 19 hours, 20 hours, 21 hours, 22 hours, 23 hours, 24 hours, up to or about 1 day, up to or about 3 days, up to or about 1 week, up to or about 2 weeks, up to 3 or about weeks, up to or about 4 weeks, up to or about 1 month, up to or about 2 months, up to or about 3 months, up to or about 4 months, up to or about 5 months, up to or about 6 months or more, from 1 hour to 6 months, from 8 hours to 6 months, from 12 hours to 6 months, from 1 day to 6 months, from 3 days to 6 months, from 1 week to 6 months, from 2 weeks to 6 months, from 1 month to 6 months, from 2 months to 6 months, from 3 months to 6 months, from 4 months to 6 months, from 5 months to 6 months, from 1 hour to 5 months, from 8 hours to 5 months, from 12 hours to 5 months, from 1 day to 5 months, from 3 days to 5 months, from 1 week to 5 months, from 2 weeks to 5 months, from 1 month to 5 months, from 2 months to 5 months, from 3 months to 5 months, from 4 months to 5 months, from 1 hour to 4 months, from 8 hours to 4 months, from 12 hours to 4 months, from 1 day to 4 months, from 3 days to 4 months, from 1 week to 4 months, from 2 weeks to 4 months, from 1 month to 4 months, from 2 months to 4 months, from 3 months to 4 months, from 1 hour to 3 months, from 8 hours to 3 months, from 12 hours to 3 months, from 1 day to 3 months, from 3 days to 3 months, from 1 week to 3 months, from 2 weeks to 3 months, from 1 month to 3 months, from 2 months to 3 months, from 1 hour to 2 months, from 8 hours to 2 months, from 12 hours to 2 months, from 1 day to 2 months, from 3 days to 2 months, from 1 week to 2 months, from 2 weeks to 2 months, from 1 month to 2 months, 1 hour to 1 month, from 8 hours to 1 month, from 12 hours to 1 month, from 1 day to 1 month, from 3 days to 1 month, from 1 week to 1 month, from 2 weeks to 1 month, from 1 hour to 2 weeks, from 8 hours to 2 weeks, from 12 hours to 2 weeks, from 1 day to 2 weeks, from 3 days to 2 weeks, from 1 week to 2 weeks, from 1 hour to 1 week, from 8 hours to 1 week, from 12 hours to 1 week, from 1 day to 1 week, or from 3 days to 1 week.

For wait periods of 3 months or longer, for example, the surface can be alternatively activated with air plasma, vacuum plasma, or other known plasma techniques, before application of an adhesive, a paint, or a weld-bonding. After or prior to high energy beam application, plasma reactors can generate and discharge ions and chemically reactive species onto hard surfaces such as metals, plastics, ceramics, and the like. Such ions and species onto the surface may induce deep cleaning with etching and/or enhanced surface energy for improved wetting. While preferably low energy plasma (cold plasma) generated near room temperature and at atmospheric pressure are desired in order to keep the substrate surface temperatures low during cleaning, high energy plasma (hot plasma) such as those used in plasma torches, fusion plasma, plasma spray, arc discharge plasma, and the like are also contemplated according to the present disclosure. Low energy plasma may also be used for the deposition of organic, inorganic, or hybrid adhesion promoters during or after the cleaning step. Any plasma discharge sources such as atmospheric pressure plasma, corona discharge, low pressure plasma (DC plasma, DC glow discharge), low to medium frequency (RF—capacitively or inductively coupled), high frequency (Microwave—Electron Cyclotron Resonance), and flame are contemplated according to the present disclosure.

Similarly, after or prior to high beam application, other dry cleaning methods such as vacuum arc may be used as a stand alone or in combination with another beam of high energy, laser, plasma systems, or any combination thereof. Dry cleaning processes may include any mechanical surface preparation such as micro-blasting, macro-blasting, carbon dioxide dry ice impact and blasting, or any combination thereof. Notably, vacuum arc systems are expensive and are more conducive to batch processes where an entire coil can be loaded into the vacuum chamber and may have significant disadvantages for plant operations running continuous rolled products. For example, moving a coil continuously from an ambient environment into a vacuum chamber requires enormous pumping capability even to achieve relatively modest vacuum levels, therefore the benefits usually derived from vacuum processing may be drastically limited.

Surface properties may be tailored using any combination of the surface preparation and treatment processes described herein to provide desired surface properties for a given end product or process. For example, carbon dioxide spray treatment may be used to remove fines and other loose debris along with hydrocarbon contamination prior to directing a beam of high energy onto the metal or metal alloy surface. Ultrasonic or radio frequency (RF) activation of the surface is contemplated according to this disclosure as may be applied to enhance any of the effects described in using the dry cleaning methods described.

In some cases, the ablation efficiency or surface modification efficiency may be improved over those in the above detailed products and methods. Another method according to the present disclosure modifies the near-surface microstructures of the alloys described herein using a liquid or condensed vapor layer applied onto the metal alloy substrate wherein the layer increases the interaction of the beam of high energy with the substrate surface thereby advantageously improving ablation efficiency. By utilizing a high beam or energy (e.g., a laser light) interaction with a layer of intentionally applied liquid onto the substrate surface, the bond durability performance can be increased to at least 75 cycles or more before failure as compared with 5 cycles without laser treatment, for example. The methods described herein advantageously provide a treated metal or metal alloy surface that is clean and/or deposited with chemically reactive species to provide stronger bonding with adhesives used down the line in manufacture, as for example in auto manufacturing. The improved bond durability strength can give rise to improved weldability, paintability, and other application related requirements including a smoother surface roughness and smoother surface topography as compared with an untreated surface. The methods described herein can also improve ablation efficiency by introducing a liquid layer, having a higher thermal conductivity than air, to reduce the heat-affected (or treatment) zone and to reduce residual thermal damages resulting from a high beam of energy treatment of the metal or metal alloy surface covered with the liquid layer. Ablation efficiency may be characterized indirectly by a cleanliness measurement using an optically stimulated electron emission (OSEE) tool. In some embodiments, the presence of a liquid layer was shown to provide relatively cleaner surfaces as measured with OSEE when compared to surfaces not having a liquid layer prior to directing a high beam of energy as with laser ablation.

Figure 6A:
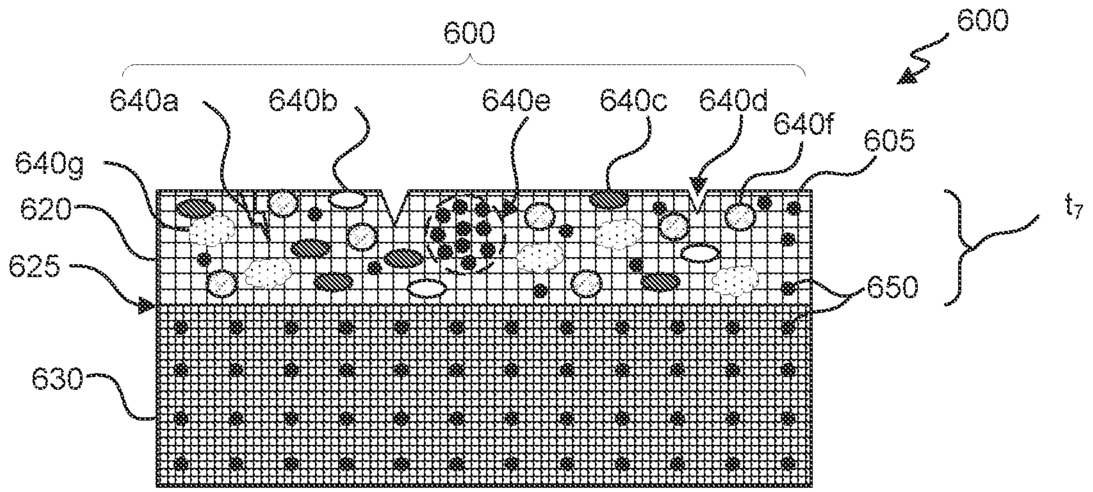
FIG. 6A provides a schematic illustration of a cross-section of a metal alloy product having an untreated surface and near-surface microstructures comprising one or more defects including metal oxide particles and intermetallic particles.
Figure 6B:
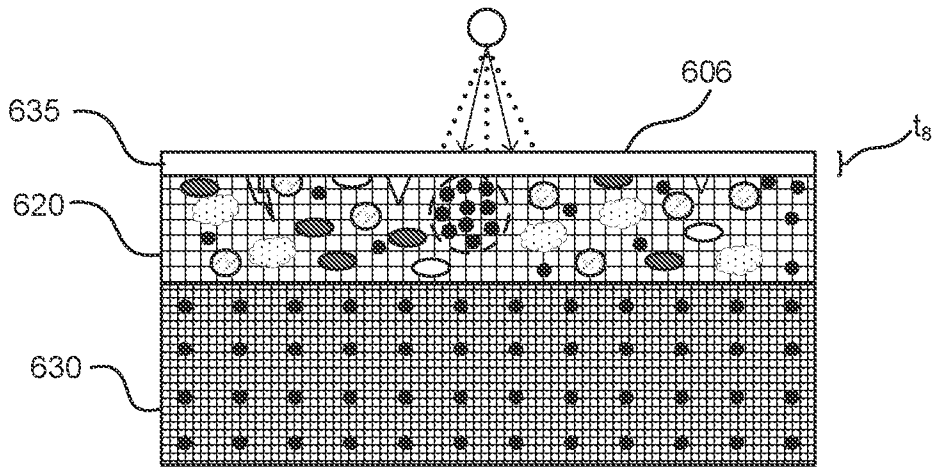
FIG. 6B provides a schematic illustration of the cross-section shown in FIG. 6A having a high thermal conductivity condensed vapor layer applied over the untreated surface.
Figure 6C:
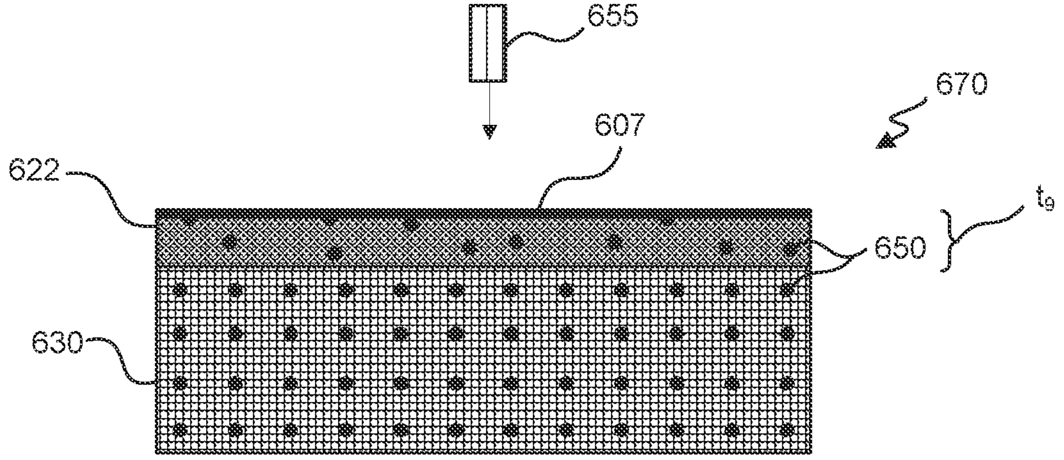
FIG. 6C provides a schematic illustration of the cross-section shown in FIG. 6B having a beam of high energy directed onto the condensed vapor layer to affect the near-surface microstructures and to provide an activated surface free of metal oxide particles and intermetallic particles.

FIGS. 6A-6C illustrate a method of modifying a surface of a metal alloy product such as a surface including near-surface microstructures. As shown in FIG. 6A, a metal alloy substrate 600 is provided. Substrate 600 may be a metal alloy product as described previously, such as an aluminum alloy product. Substrate 600 has near-surface microstructures 620 and a bulk microstructure 630, as similarly described with respect to FIG. 2, FIG. 3A, and FIG. 4A. The near-surface microstructures 620 include or comprise an untreated surface 605. Untreated surface 605 has not undergone any surface treatment or modification including, but not limited to, chemical or wet etching techniques and/or conversion coatings. Optionally, surface 605 may undergo a chemical cleaning, water washing (at room temperature or at elevated temperatures), mechanical surface cleaning, activation, or texturing, or any other cleaning method as needed. In some embodiments, at least one surface 605, or some exposed surfaces, or all of the exposed surfaces of substrate 600, are untreated. The near-surface microstructures 620 of substrate 600 includes at least some of the defects 640*a*-640*g* as shown in FIG. 6A, similar to defects 240*a*-240*g* described with respect to FIG. 2 and to defects 440*a*-440*g* as shown in FIG. 4A. As shown in FIG. 6A, near-surface microstructures 620 includes defects 640. Defects 640 include rolled-in materials including a plurality of metal oxides 640*c*, a plurality of intermetallic particles 640*f*, and organics, oils, and hydrocarbons 640*g*. Defects 640 may also include defects including internal cracks 640*a*, voids 640*b*, surface cracks 640*d*, and high density populations of alloying elements 640*e*.

A liquid is applied to the untreated surface 605 of FIG. 6A to form a layer 635, as in FIG. 6B. In some embodiments another surface, opposite surface 606, also has a liquid applied so that both sides of the metal alloy substrate 600 include a liquid layer 635. Liquid may be a condensed vapor to form a liquid layer 635 or film. In some embodiments, a first liquid layer is applied to surface 605 and a second liquid layer is applied to surface 685, wherein the first and second liquid layers may be the same or different. The presence of liquid layer 635, as compared with air or no liquid layer, may, in embodiment, enhance energy-coupling efficiency with the directed beam of energy (as shown in FIG. 6C). Liquid layer 635 as shown in FIG. 6B may comprise aqueous solutions or a non-aqueous solutions. Suitable solutions may include or be generated using glycerin, alcoholic solutions, steam, or combinations thereof. Solutions may optionally include pretreatment chemicals, anodic and/or cathodic corrosion inhibitors, or combinations thereof. A pretreatment chemical may be configured to at least one of inhibit corrosion, texturize the surface, and increase adhesion by changing the surface chemistry and/or the mechanical state. Suitable pretreatment chemicals for adding to solutions may be chosen from organophosphonic acid, organophosphinic acid, silanes, coupling agents, polymers, copolymers, pretreatments including zirconium/molybdenum (Zr/Mo), pretreatments including manganese (Mn), pretreatments including cerium (Ce), adhesion promoters or any suitable chemicals or mechanical techniques to alter and/or functionalize the surface by chemical, mechanical, and/or electrochemical methods, or any combination thereof. By including optional pretreatment chemicals, the metal or metal alloy surface may be simultaneously cleaned while further providing a surface tailored for improved bond durability and coating adhesion performance. In some embodiments, the metal or metal alloy surface can be treated without any prior cleaning step including simultaneous cleaning, activation, and functionalization while texturing via dry techniques or with vapor, aqueous, or non-aqueous thin films present on the metal or metal alloy surface. In some embodiments, the enhancement of the interaction of the metal surface with a high beam of energy with a liquid layer is further enhanced with deposited chemically reactive species onto the treated surface. Coatings such as from a slurry, gel, or paste are also contemplated. Suitable coatings may include or be chosen from metals, polymers, or ceramics to enhance the high beam of energy interaction with layer 635.

Figure 7:
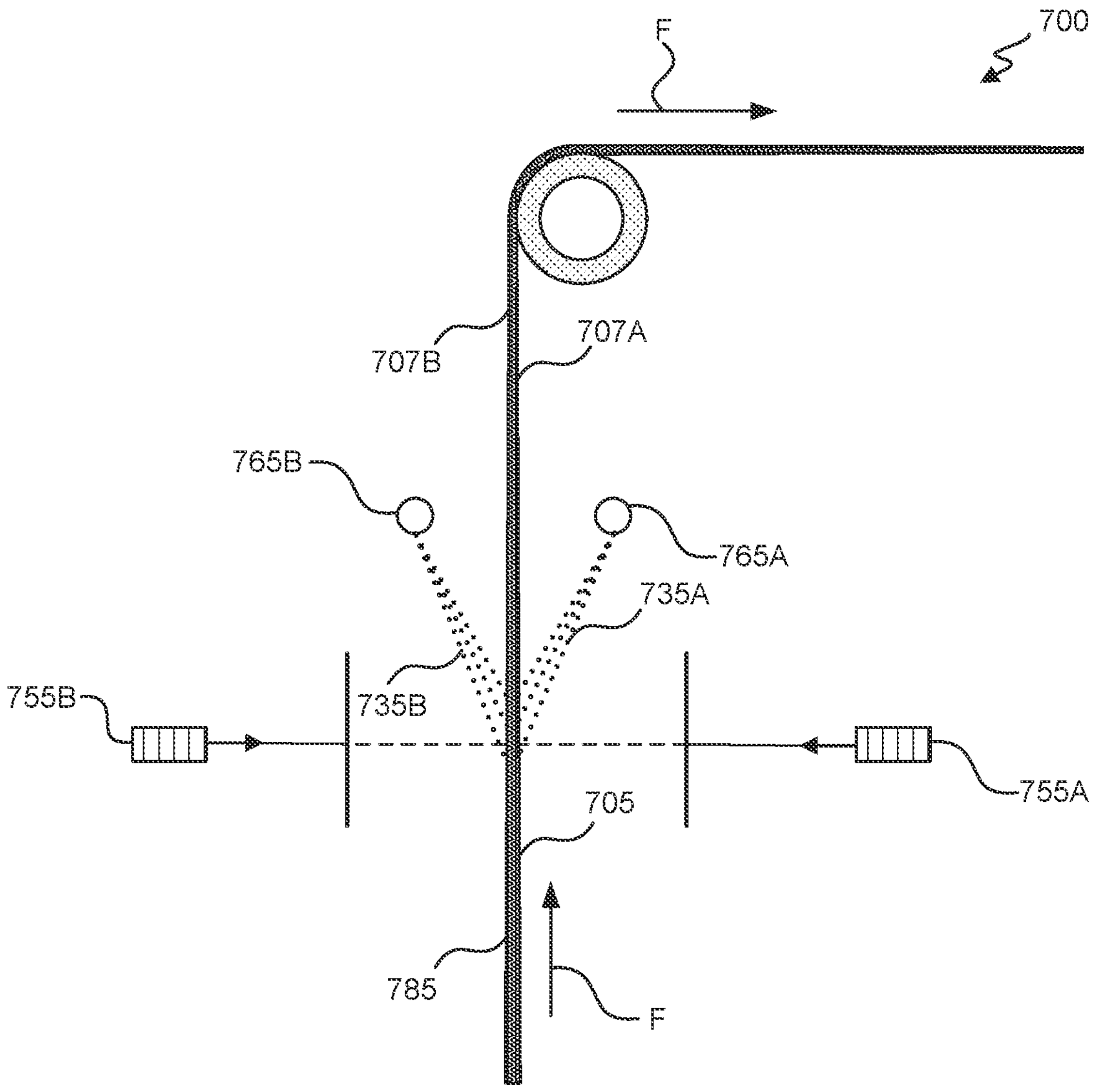
FIG. 7 provides a schematic illustration of a continuous coil line process for making an aluminum alloy product having a condensed vapor layer applied to each of two sides opposite one another prior to having a beam of high energy directed onto each side.
Figure 8:
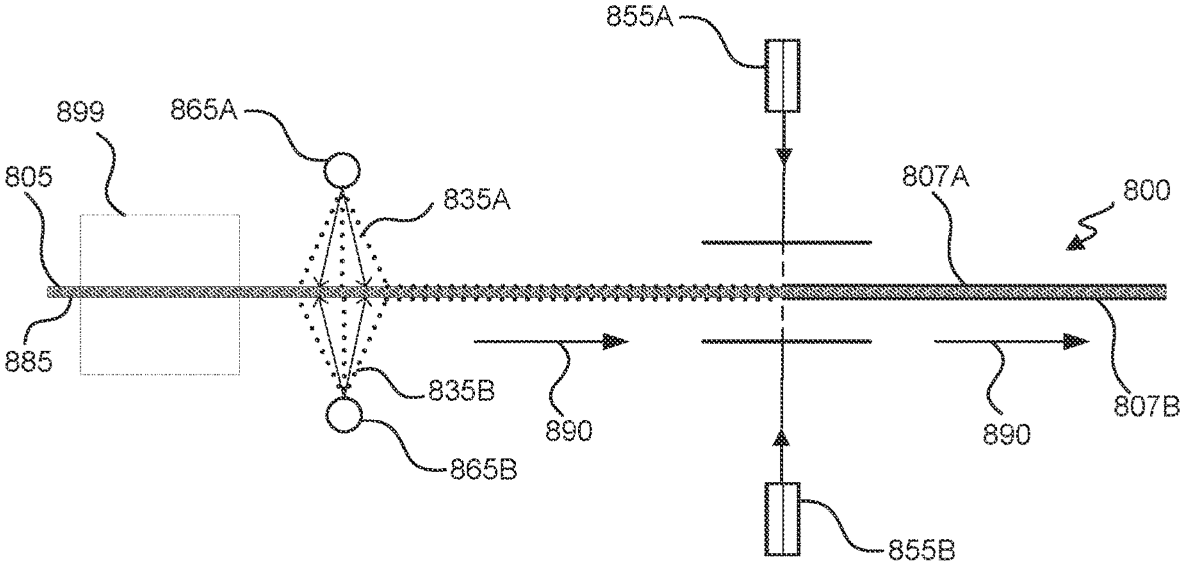
FIG. 8 provides a schematic illustration of a continuous coil line process for making an aluminum alloy product in another embodiment, where a condensed vapor layer is applied to each side of the product simultaneously prior to having a beam of high energy directed onto each side.
Figure 9:
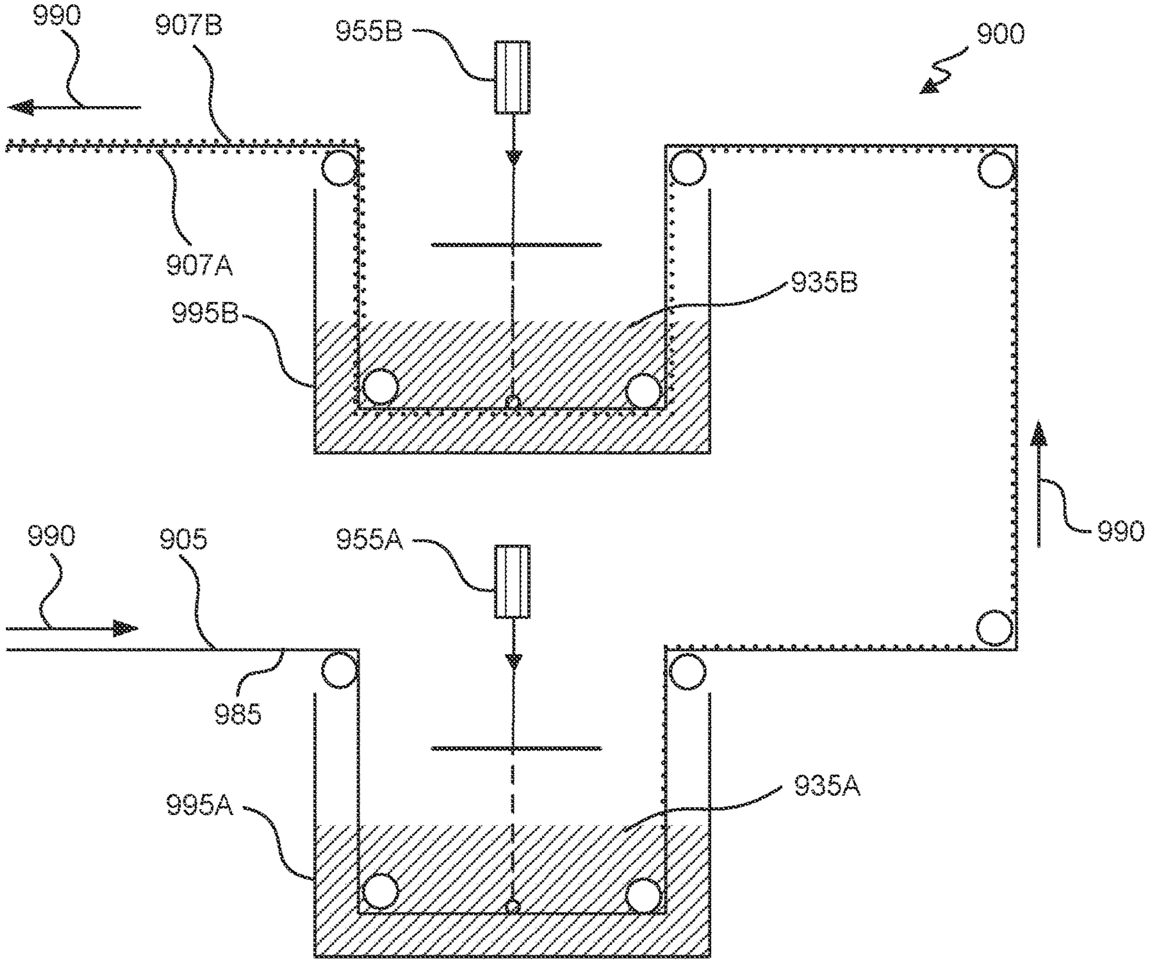
FIG. 9 provides a schematic illustration of a continuous coil line process for making an aluminum alloy product having a thicker layer, such as condensed vapor or aqueous or non-aqueous solution, applied to and/or coupled to each side of the product consecutively prior to having a beam of high energy directed onto the condensed vapor layer.

Application of layer 635, as in FIG. 6B, may be provided by an applicator, or by two or more applicators. By using two more applicators, the speed at which the substrate surface(s) being covered with a liquid layer or film on one or both substrate surfaces may be greatly increased. Using two or more applicators is suitable for the non-limiting continuous line embodiments as shown in FIGS. 7-9. The applicator(s) may be at least one chosen from a spray applicator with or without pulsing, a low pressure high volume spray applicator, a low pressure low volume spray applicator, a rotary atomizer, an electrostatic applicator, a roll applicator, or combinations thereof.

A beam of high energy 655, as shown in FIG. 6C, is directed onto the surface 606 including liquid layer 605 (of FIG. 6B) to physically and chemically modify the surface to provide an activated surface 607 as in FIG. 6C that is devoid of at least some of the defects 640.

Near-surface microstructures 620 of FIG. 6A have a thickness $t_7$. Liquid layer 635 of FIG. 6B has a thickness $t_5$. The beam of high energy 655 may remove at least a portion of the near-surface microstructures 620. In other words, after directing the beam of high energy 655 onto the surface 606, the thickness $t_9$ of the near-surface microstructures 620 associated with cleaned surface 607 may be reduced relative to the thickness $t_7$ of the near-surface microstructures 620 associated with untreated surface 605.

The beam of high energy 655 directed onto the surface 606 (of FIG. 6B) may provide an activated surface 607 as shown in FIG. 6C, optionally having near-surface microstructures 622. The beam of high energy directed onto the liquid layer 635 having surface 606 may affect the near-surface microstructures through high beam or energy interactions with the liquid layer that may melt at least one of the plurality of metal oxides 640*c* and the plurality of intermetallic particles 640*f*. The melted particles may be incorporated into the bulk composition. Activated surface 607 associated with near-surface microstructures 622 is substantially devoid of at least one of the plurality of metal oxides 640*c* and the plurality of intermetallic particles 640*f*. In embodiments, activated surface 607 associated with near-surface microstructures 622 is substantially devoid of metal oxides 640*c* and intermetallic particles 640*f* In embodiments, the near-surface microstructures 622 together with the activated surface 607 of FIG. 6C have a thickness $t_9$. After directing the beam of high energy 655 onto the surface 606, having thickness $t_8$ over near-surface microstructure 620 having thickness $t_7$, thickness the thickness $t_9$ is reduced relative to the thickness $t_7$. Optionally, the near surface microstructures 620 or 622 may be completely removed or modified, such as to provide a thickness $t_9$ of zero, such that bulk 630 may be exposed as the top surface and may comprise or be associated with activated surface 607. In some embodiments, thickness $t_9$ is less than or equal to thickness $t_7$. In embodiments, the near-surface microstructures are removed up to a depth of about 10 μm, or up to about 5 μm. In some examples, a 2 mm thick layer of deionized water can be applied to a 6xxx series aluminum alloy for surface treatment according the methods herein resulting in a removal of about 5 μm or about 10 μm of a near surface microstructure layer. In other words, the thickness $t_9$ is less than the thickness $t_7$ by about 10 μm, or by about 5 μm, as a result of directing beam of high energy 655 onto the surface of the substrate.

Advantageously, modifying the surface 605 to generate activated surface 607 by exposure to beam of high energy 655 in the presence of liquid layer 635 may change a bond durability of a bond between the surface and another product from a relatively shorter bond durability to a relatively longer or higher performing bond durability. In embodiments, the activated surface 607 as in FIG. 6C may exhibit a bond durability of at least 35 cycles, at least 40 cycles, at least 45 cycles, at least 50 cycles, or more. Further, the laser and metal or metal alloy surface coupling provide a cleaner and smoother surface as compared with ablated surfaces not including a liquid layer. The improved surface may result from efficient debris removal realized by the induced thermal convection currents and bubble motion during the strong coupling between the high energy laser beam and the metal or metal alloy surface.

Additionally the methods described herein may substantially or completely ablate the surface and near-surface microstructure to remove the surface as well as at least partially any subsurface layers. This may result in a clean surface that is functionalized with enriched oxide formation and hydroxyl chemical species. This may be performed in air so that the oxygen in air reacts with the metal surface at the high temperatures generated by the laser to form an enriched oxide layer, which is distinctly different from near surface microstructures of untreated surfaces. The enriched oxide layer may be hydrated by any residual water on the surface or by humid air. A metal or metal alloy surface functionalized with enriched oxide formation and hydroxyl chemical species may readily react and provide bonding with adhesives to provide extended BD performance.

Substrate 600 may include non-ferrous materials, including aluminum, aluminum alloys, magnesium, magnesium-based materials, magnesium alloys, magnesium composites, titanium, titanium-based materials, titanium alloys, copper, copper-based materials, composites, sheets used in composites, or any other suitable metal, non-metal or combination of materials, depending on the particular alloy or metals used. In some embodiments, substrate 600 comprises an aluminum alloy, a magnesium, magnesium alloy, a magnesium composites, steel, or any combination thereof. In some embodiments, substrate 600 is an aluminum alloy. Useful aluminum alloys include any of those detailed previously, for example, 1xxx series aluminum alloys, 2xxx series aluminum alloys, 3xxx series aluminum alloys, 4xxx series aluminum alloys, 5xxx series aluminum alloys, 6xxx series aluminum alloys, 7xxx series aluminum alloys, or 8xxx series aluminum alloys.

The beam of high energy 655, as in FIG. 6C, may be provided by a laser, or by two or more lasers. By using two more lasers units, the speed at which the substrate surface(s) having a liquid layer on one or both substrate surfaces may be treated is greatly increased. Using two or more lasers is suitable for the non-limiting continuous line embodiments as shown in FIGS. 7-9. The laser(s) may be at least one chosen from a continuous laser, a pulsed laser, a nanosecond pulsed laser, a picosecond pulsed laser, or a femtosecond pulsed laser, single and/or double pass configurations, and with or without continuous wave. The laser may be at least one chosen from ytterbium, Nd-YAG, $CO_2$, or excimer, or may be any suitable laser providing the desired energy density. The laser may have any suitable wavelength, such as from about 200 nm to about 1500 nm. Wavelength, frequency, work distance, laser light incidence angle, and energy levels may be tailored according to some embodiments.

The beam of high energy 655, as in FIG. 6C, may have an energy density in the range from at least 10 $mJ/mm^2$ to at most 200 $mJ/mm^2$. The energy density may range from 10 $mJ/mm^2$ to 30 $mJ/mm^2$, from 20 $mJ/mm^2$ to 40 $mJ/mm^2$, from 30 $mJ/mm^2$ to 50 $mJ/mm^2$, from 40 $mJ/mm^2$ to 60 $mJ/mm^2$, from 50 $mJ/mm^2$ to 70 $mJ/mm^2$, from 60 $mJ/mm^2$ to 80 $mJ/mm^2$, from 70 $mJ/mm^2$ to 90 $mJ/mm^2$, from 80 $mJ/mm^2$ to 100 $mJ/mm^2$, from 90 $mJ/mm^2$ to 110 $mJ/mm^2$, from 100 $mJ/mm^2$ to 120 $mJ/mm^2$, from 110 $mJ/mm^2$ to 130 $mJ/mm^2$, from 120 $mJ/mm^2$ to 140 $mJ/mm^2$, from 130 $mJ/mm^2$ to 150 $mJ/mm^2$, from 140 $mJ/mm^2$ to 160 $mJ/mm^2$, from 150 $mJ/mm^2$ to 170 $mJ/mm^2$, from 160 $mJ/mm^2$ to 180 $mJ/mm^2$, from 170 $mJ/mm^2$ to 190 $mJ/mm^2$, from 180 $mJ/mm^2$ to 200 $mJ/mm^2$, or any subranges thereof. In embodiments, the power of the beam of high energy may be in the range from at least 7 W to at most 1000 W. The power may range from 7 W to 100 W, from 50 W to 150 W, from 100 W to 200 W, from 150 W to 250 W, from 200 W to 300 W, from 250 W to 350 W, from 300 W to 400 W, from 350 W to 450 W, from 400 W to 500 W, from 450 W to 550 W, from 500 W to 600 W, from 550 W to 650 W, from 600 W to 700 W, from 650 W to 750 W, from 700 W to 800 W, from 750 W to 850 W, from 800 W to 900 W, from 850 W to 950 W, from 900 W to 1000 W, or any subranges thereof.

Optionally, steam or another gas or method may be used after directing the beam of high energy to the surface in order to prepare the surface for the adhesive joints. Advantageously, metal by-products may result and may include metal nanopowders formed during the laser ablation of aluminum alloy substrates or sheets according to some embodiments disclosed herein. These metal nanopowders may be captured via filtering and drying for use in metal powder processes or other processes. Referring to FIGS. 7-9, continuous line embodiments are shown in accordance with methods disclosed herein. FIG. 7 illustrates schematically one embodiment of a continuous line process by which both sides of a substrate (as shown in sheet form) are applied with a first and second liquid from applicators 765A and 765B. The continuous line process moves a substrate or substrate sheet 700 in a direction as indicated by the flow arrows F. The application of at least one liquid 735A and 735B is performed concurrently with directed beams of high energy from a first laser 755A and a second laser 755B one or more substrate surfaces. For example, applicator 765A applies substrate surface 705 with a liquid 735A and applicator 765B applies substrate surface 785 with a liquid 735B. Concurrently, a beam of high energy is delivered to substrate surface 705 by laser 755A and a beam of high energy is delivered to substrate surface 785 by laser 755B. Interactions between the laser energy and the liquids 735A and 735B at the surfaces 705 and 785, respectively, result in treated surfaces 707A and 707B along the continuous line process as indicated by the flow arrows. For the embodiment shown in FIG. 7, the thickness of layers 735A and 735B range from a molecular level of condensed vapor to a liquid layer of at most 5 mm for complete surface coverage of the sheet. Liquid layers 735A and 735B may be the same or different.

FIG. 8 illustrates schematically another embodiment of a continuous line process. Both sides of a substrate 800 are applied with first and second liquids (e.g., 835A and 835B) from applicators 865A and 865B. Optionally the substrate is cleaned by chemical, water washing, or other cleaning or washing methods known in the art at box 899. The cleaning may be at room temperature or at elevated temperatures up to about 90° C. In some embodiments, cleaning is performed at less than 50° C. to minimize and control any evaporative losses for aqueous cleaners. Similar temperatures may be used for non-aqueous cleaners. Vapor degreasing may be useful prior to laser functionalization and texturing the surface of a coil. The continuous line process moves a substrate or substrate sheet 800 in a direction as indicated by the arrows 890. The application of at least one liquid 835 may be performed in advance of directing beams of high energy from lasers 855A and 855B. For example, applicator 865A applies substrate surface 805 with a liquid 835A and applicator 865B applies substrate surface 885 with a liquid 835B. A beam of high energy may be delivered to substrate surface 805 by laser 855A and a beam of high energy may be delivered to substrate surface 885 by laser 855B. Interactions between the laser energy and the liquids 835A and 835B covering surfaces 805 and 885, respectively, result in treated surfaces 807A and 807B. For the embodiment shown in FIG. 8, the thickness of layers 835A and 835B range from a molecular level of condensed vapor to a liquid layer of at most 5 mm for complete surface coverage of the sheet. Liquid layers 835A and 835B may be the same or different.

FIG. 9 illustrates schematically yet another embodiment of a continuous line process. For the embodiment shown in FIG. 9, the thickness of layers 935A and 935B are at most 5 mm. In some embodiments, the thickness of the layer can be greater than 5 mm provided the film thickness is consistent and allows for interaction and coupling between the laser and the metal or metal alloy surface to functionalize and texturize to obtain desired properties. Substrate 900 is applied with first and second liquids (e.g., 935A and 935B), at a temperature of less than 90° C., preferably less than 50° C., and more preferably at room temperature, from applicator baths 995A and 995B. The continuous line process moves a substrate or substrate sheet 900 in a direction as indicated by the arrows 990. The application of at least one liquid 935 may be performed concurrently (as shown in FIG. 9) or in advance of directing beams of high energy from a lasers 955A and 955B by adjusting placement of the lasers. For example, applicator bath 995A applies substrate surface 905 with a liquid 935A and applicator bath 995B applies substrate surface 985 with a liquid 935B. A beam of high energy may be delivered to substrate surface 905 by laser 955A and a beam of high energy may be delivered to substrate surface 985 by laser 955B. Interactions between the laser energy and the liquids 935A and 935B covering surfaces 905 and 985, respectively, result in treated surfaces 907A and 907B. Liquid layers 935A and 935B may be the same or different. In some embodiments, liquid layers 935A and 935B of baths 995A and 995 may provide coverage to both sides 905 and 985. For the embodiment shown in FIG. 9, the thickness of layers 935A and 935B are at most about 5 mm. In some embodiments, the thickness of the layer can be greater than 5 mm provided the film thickness is consistent and allows for interaction and coupling between the laser and the metal or metal alloy surface to functionalize and texturize to obtain desired properties.

Treated surfaces 707A, 707B, 807A, 807B, 907A, and 907B as in FIGS. 7-9 are suitable for bonding and may be useful as auto sheet products, for example. Auto sheet products may include, but are not-limited to, 5xxx series aluminum alloys, 6xxx series aluminum alloys, or 7xxx series aluminum alloys, for example. Auto sheet products may be DC cast or CC cast, or cladded, or the like.

The following examples will serve to further illustrate the present invention without, at the same time, however, constituting any limitation thereof. On the contrary, it is to be clearly understood that resort may be had to various embodiments, modifications and equivalents thereof which, after reading the description herein, may suggest themselves to those skilled in the art without departing from the spirit of the invention. During the studies described in the following examples, conventional procedures were followed, unless otherwise stated. Some of the procedures are described below for illustrative purposes.

Example 1

Figure 10A:
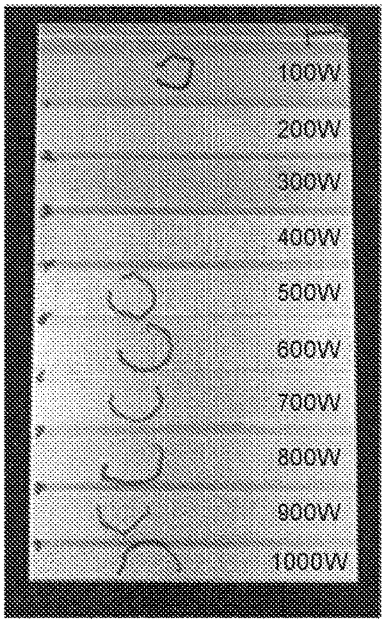
FIG. 10A provides an image of a first example of a textured surface of an aluminum alloy product.
Figure 10B:
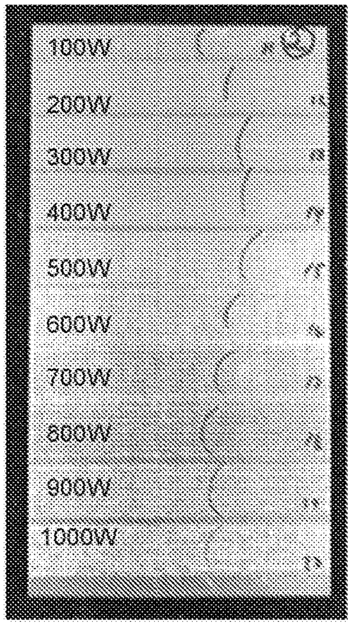
FIG. 10B provides an image of a second example of a textured surface of an aluminum alloy product.
Figure 10C:
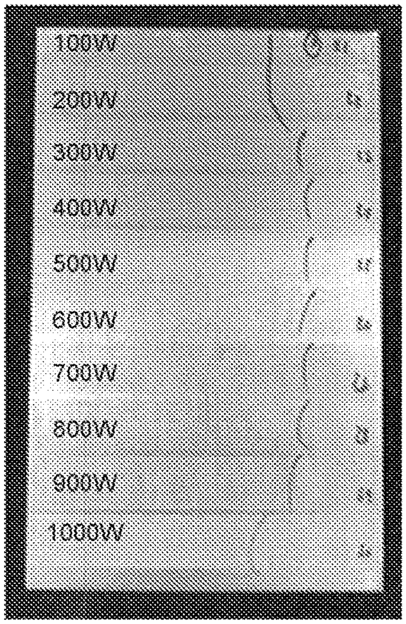
FIG. 10C provides an image of a third example of a textured surface of an aluminum alloy product.
Figure 10D:
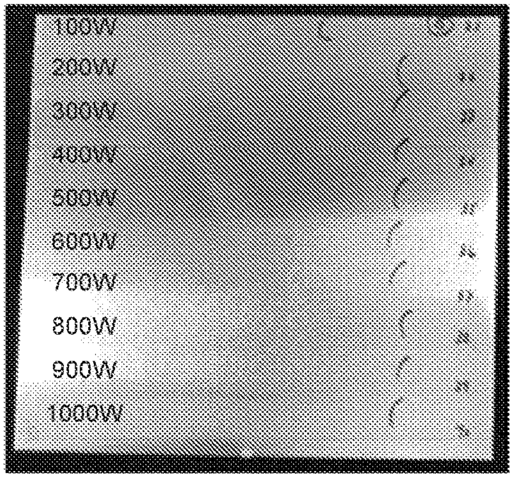
FIG. 10D provides an image of a fourth example of a textured surface of an aluminum alloy product.
Figure 10E:
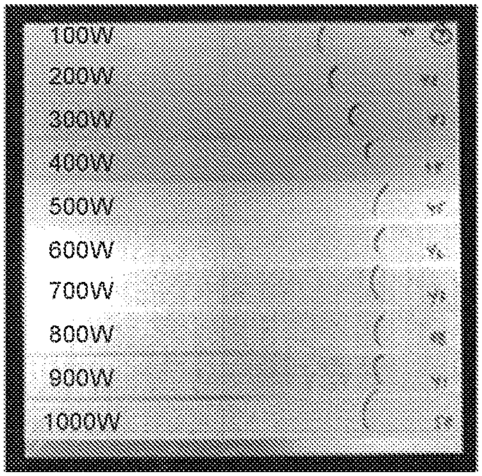
FIG. 10E provides an image of a fifth example of a textured surface of an aluminum alloy product.

Aluminum alloy product samples were prepared by direct chill (DC) casting, hot rolling, cold rolling, and solution heat treatment to produce AA5182 sheet samples (tested in O temper) and AA6451 sheet samples (tested in T4 temper) at a final gauge thickness of 0.9 mm to 2.0 mm. The sheet samples were then positioned to expose a surface to a nanosecond ytterbium laser (Model YLPN, 1064 nm, IPG Photonics) at a pulse duration of 40 ns, 30% overlap, up to 1000 W, 0.85 mm or 1.4 mm spot size, and a frequency of 10 kHz or 20 kHz and the laser beam settings and surface tailoring parameters were adjusted to effect different surface textures as shown in FIG. 10A, FIG. 10B, FIG. 10C for the AA5182 samples and in FIG. 10D and FIG. 10E for the AA6451 samples. FIG. 10A shows the surface texture evolution for the AA5182 alloy treated with from 100 W to 1000 W at 10 kHz with a spot size of 0.85 mm. Similarly, FIG. 10B shows the surface texture evolution for the AA5182 alloy treated with from 100 W to 1000 W at 10 kHz with a spot size of 1.4 mm. FIG. 10C shows the surface texture evolution for the AA5182 alloy treated with from 100 W to 1000 W at 20 kHz with a spot size of 1.4 mm. FIG. 10D-10E for the AA6451 samples show the surface texture evolution at ten different power regimes, as shown starting from 100 W at the top to 1000 W at the bottom, at 10 kHz and 20 kHz respectively, with a spot size of 1.4 mm. The texturing of the surfaces shown increases with increasing power. Contact angles for water with the resultant surfaces as a function of laser beam energy were obtained by a standard technique using the Sessile drop contact angle measurement.

Figure 11A:
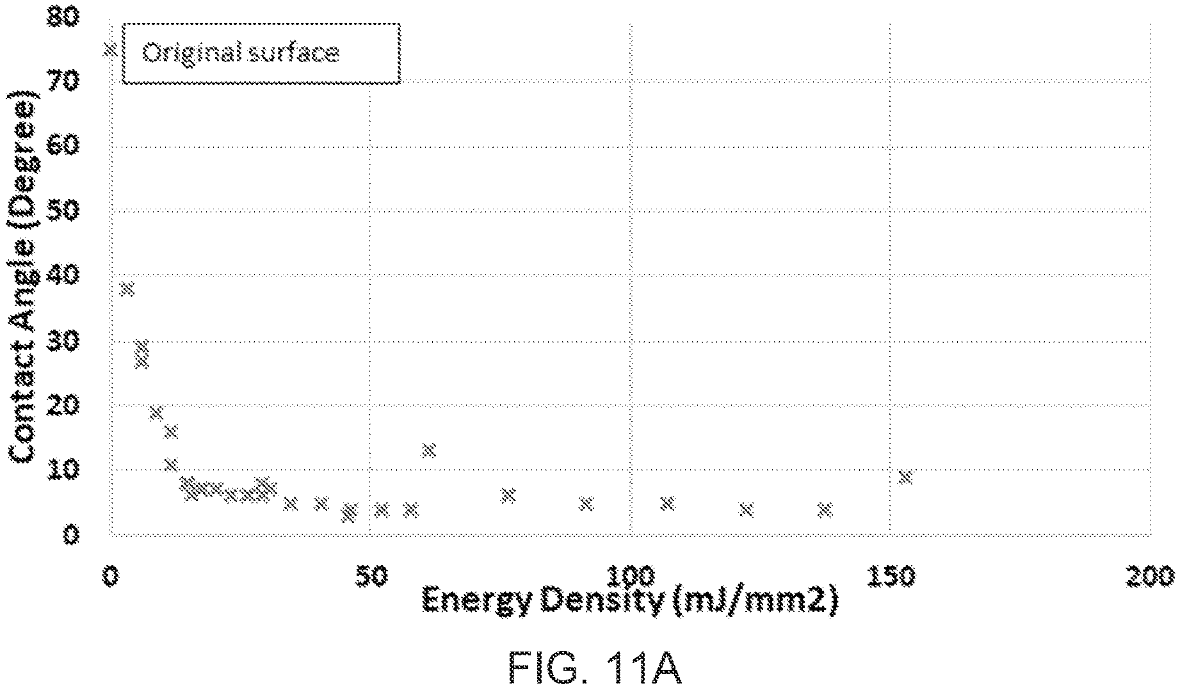
FIG. 11A provides a plot showing contact angle at various laser energy densities for an aluminum alloy product.

FIG. 11A shows a plot including an x-axis corresponding to the energy density (mJ/mm$^2$) of the ytterbium laser and a y-axis corresponding to the contact angle in degrees for the resultant sample surfaces. The original AA5182 surface was measured to have a contact angle of 76 degrees. As the energy density of the laser was increased from 0 to about 15 mJ/mm$^2$, the contact angle decreased sharply to less than 10 degrees. The lower contact angle is indicative of improved wettability and good bonding durability behavior. Further increasing the energy density above about 15 mJ/mm$^2$ showed that the contact angle remained steadily low at about 5 degrees at an energy density from about 15 mJ/mm$^2$ to more than 100 mJ/mm$^2$.

Figure 11B:
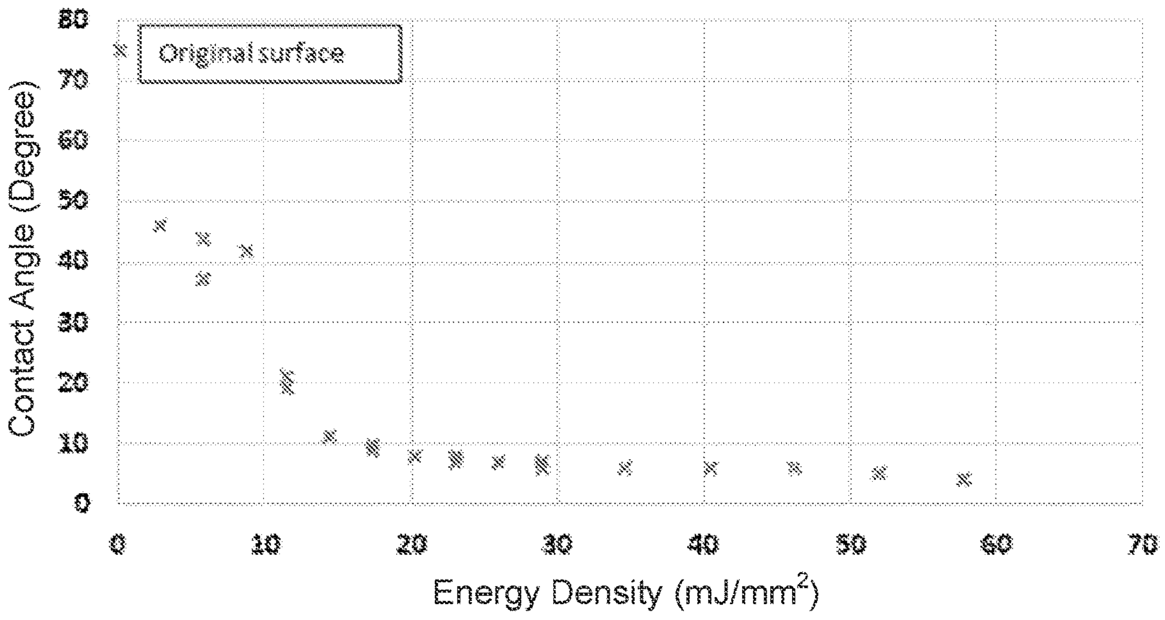
FIG. 11B provides a plot showing contact angle at various laser energy densities for another aluminum alloy product.

FIG. 11B shows a plot including an x-axis corresponding to the energy density (mJ/mm$^2$) of the ytterbium laser and a y-axis corresponding to the contact angle in degrees for the resultant sample surfaces. The original AA6451 surface was measured to have a contact angle of 75 degrees. As the energy density of the laser was increased from 0 to about 15 mJ/mm$^2$, the contact angle decreased sharply to about 10 degrees. Further increasing the energy density above about 15 mJ/mm$^2$ showed that the contact angle decreased to about 5 degrees at about 52 mJ/mm$^2$.

AA5182 sheet samples treated and surface texturized at 15 mJ/mm$^2$, 23.1 mJ/mm$^2$, and 57.8 mJ/mm$^2$, each with 1.4 mm spot size, were adhesively bonded and subjected to bond durability testing according to an example standard test for determining bond durability: FLTM BV 101-07 Standard Test, Stress Durability Test for Adhesive Lap Shear Joints (2017). During bond durability testing, each sample consisted of two pieces of aluminum alloy product sheet, prepared and treated under identical conditions, which were then bonded together at six bonding sites using an epoxy adhesive. Next, each sample was subjected to various test conditions including one or more of immersion in a salt solution, exposure to humid conditions, exposure to dry conditions, and/or application of force inducing stress or strain. Each sample was subjected to numerous bond durability cycles under such test conditions. The number of cycles a sample was subjected to was either the number of cycles to reach mechanical failure or 60 cycles or more. Bond Durability Performance testing for AA5182 samples surface treated with 15 mJ/mm$^2$ resulted in an average of 60 cycles, and AA5182 alloy samples surface treated and texturized with 23.1 mJ/mm$^2$ resulted in an increased Bond Durability Performance of 115 cycles. The AA5182 samples prepared at the high energetic level of 57.8 mJ/mm$^2$ resulted in early failures at less than 10 cycles.

Example 2

Figure 12A:
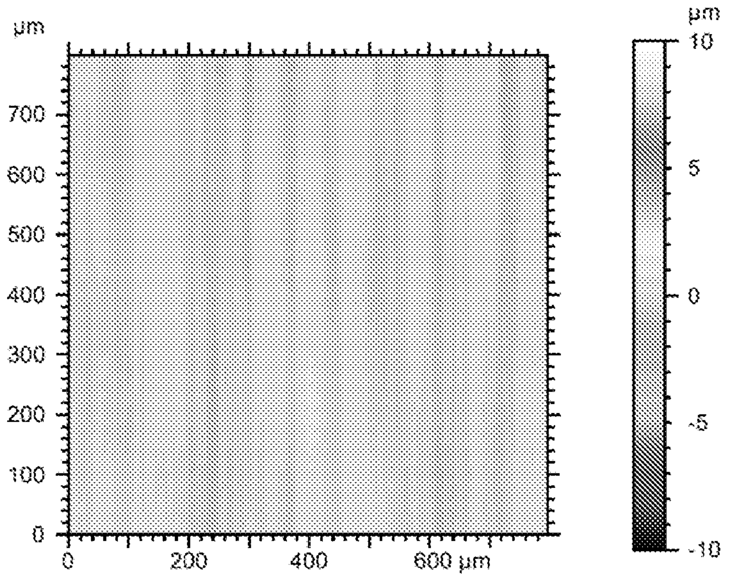
FIG. 12A provides a topography analysis for an aluminum alloy product having an untreated surface.
Figure 12B:
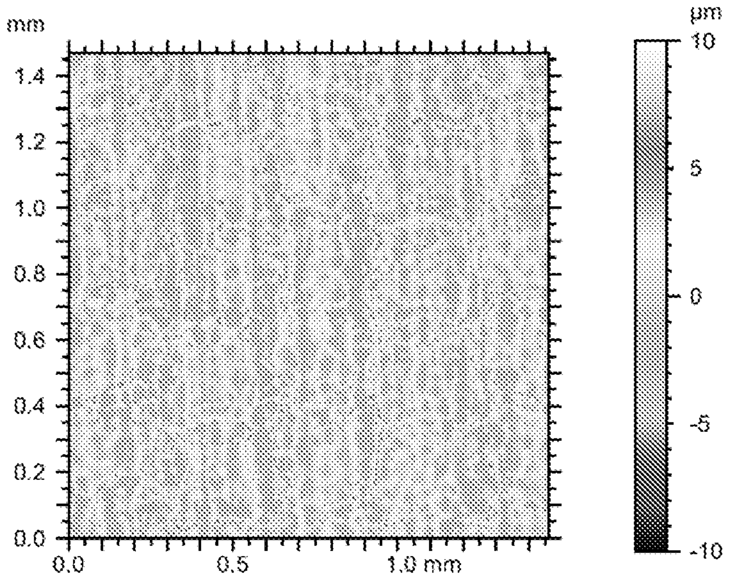
FIG. 12B provides a topography analysis for an aluminum alloy product having a surface treated with a laser at 25% overlap between passes.
Figure 12C:
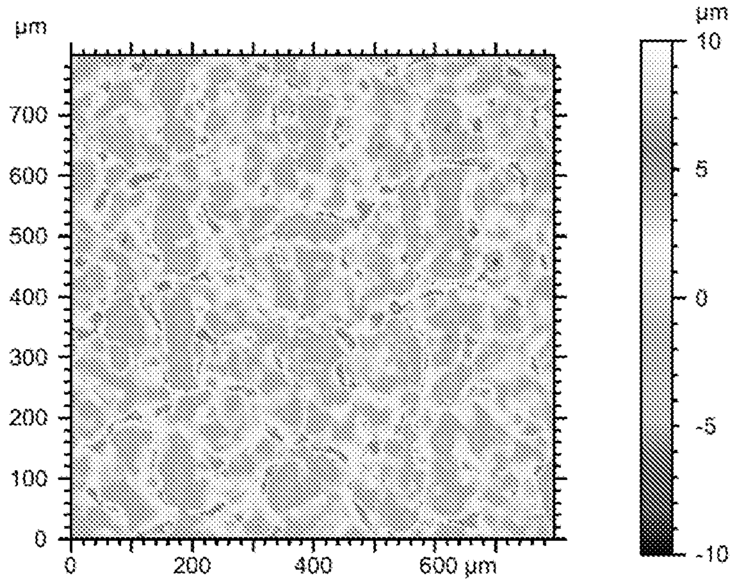
FIG. 12C provides a topography analysis for an aluminum alloy product having a surface treated with a laser at 50% overlap between passes.

Aluminum alloy product samples were prepared by DC casting, hot rolling, cold rolling, lab heat treating at 480° C. for 5 minutes to simulate hot forming temperatures, and artificially aging to T6 temper at 125° C. for 24 hours to produce AA7075 sheet samples having a final gauge of about 2.8 mm. Surfaces of the sheet samples were then exposed to a CL300 Watt high intensity laser (Adapt Laser, LLC) having a frequency range of 15 kHz to 40 kHz. The laser was pulsed across the surfaces with varying levels of overlap (25% and 50%) per subsequent pulse at 300 W and a spot size of 428 μm. The topography of the surfaces of the samples before and after laser treatment were measured as shown in FIGS. 12A-12C. As a comparative, FIG. 12A shows the topography as measured on an original mill finish surface or an 'untreated' surface for an AA7075 sheet sample. FIG. 12B shows the topography as measured on a surface of an AA7075 sheet sample, for which a pulsed laser beam of high energy was directed to the exposed surface with a 25% overlap between pulses. FIG. 12C shows the topography as measured on a surface of an AA7075 sheet sample, for which a pulsed laser beam of high energy was directed to the exposed surface with a 50% overlap between pulses. The increased overlap from 25% to 50% resulted in a rougher surface topography as indicated by the ranges of color output on the measured topographies. The results showed that increasing the overlap percentage produced a higher surface roughness (Sa as measured in 3D). Sa values were measured to be 0.3 μm for the untreated surface (as shown in FIG. 12A), about 1.1 μm for the surface (as shown in FIG. 12B) laser treated with a 25% overlap between pulses, and about 1.4 μm for the surface (as shown in FIG. 12C) laser treated with a 50% overlap between pulses.

The samples were adhesively bonded and subjected to bond durability testing according to standard test method FLTM BV 101-07 as described above in Example 1. During bond durability testing, each sample was made of two pieces of aluminum alloy product, prepared and treated using the same conditions, bonded together via six bonding sites using an epoxy adhesive. Next, each sample was subjected to various test conditions. For example, the test conditions included one or more of immersion in a salt solution, exposure to humid conditions, exposure to dry conditions, or application of force inducing stress or strain. Each sample was subjected to numerous cycles of these test conditions. The number of cycles a sample was subjected to was either the number of cycles to reach mechanical failure or 60 cycles, the maximum number of cycles used in this particular standard test. Mechanical failure includes bond failure or a break in the adhesive. Bond Durability Performance testing for AA7075 with temper T6 includes samples surface treated at 15 kHz with laser CL300 at 50% overlap resulted in the maximum 60 cycles for all twelve samples tested. The AA7075 (T6) samples surface treated at 15 kHz with laser CL300 at 20% overlap resulted in the maximum 60 cycles for five samples tested and the sixth sample failed at 43 cycles. Aged for three months, the AA7075 (T6) as above at 50% overlap resulted in an average bond durability of 95 cycles for the twelve samples tested. Aged for six months, the AA7075 (T6) as above at 50% overlap resulted in a bond durability of the maximum 60 cycles tested for ten of twelve samples tested, with an eleventh sample failing at 51 cycles and a twelfth sample failing at 60 cycles.

Figure 13:
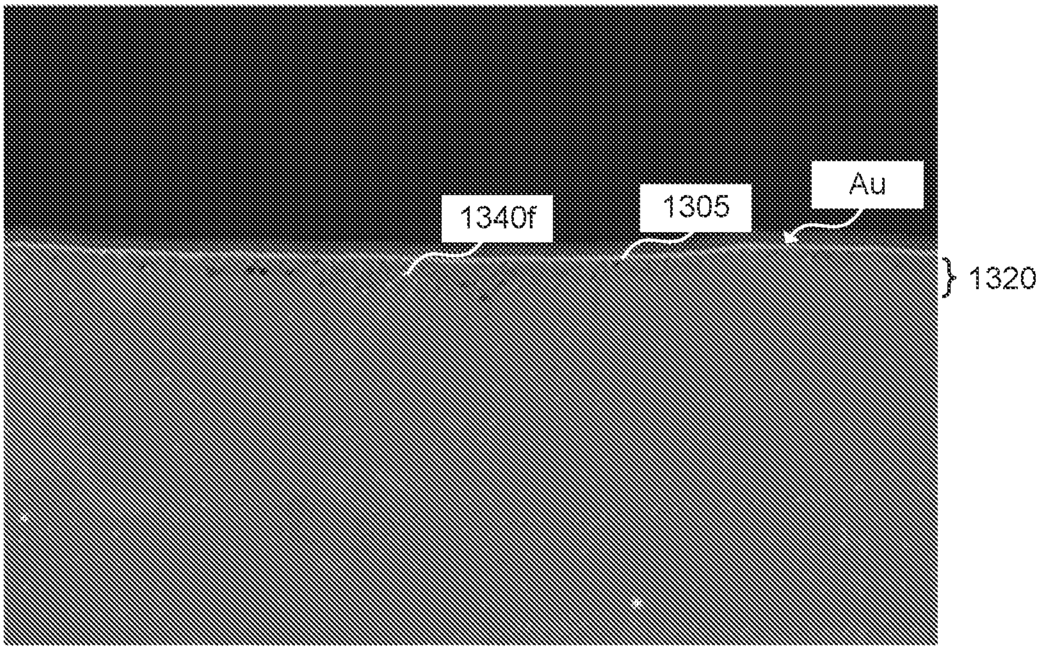
FIG. 13 is an electron micrograph image of a cross-section of an aluminum alloy product having an untreated surface and showing near-surface microstructures including a metal oxide layer.
Figure 14:
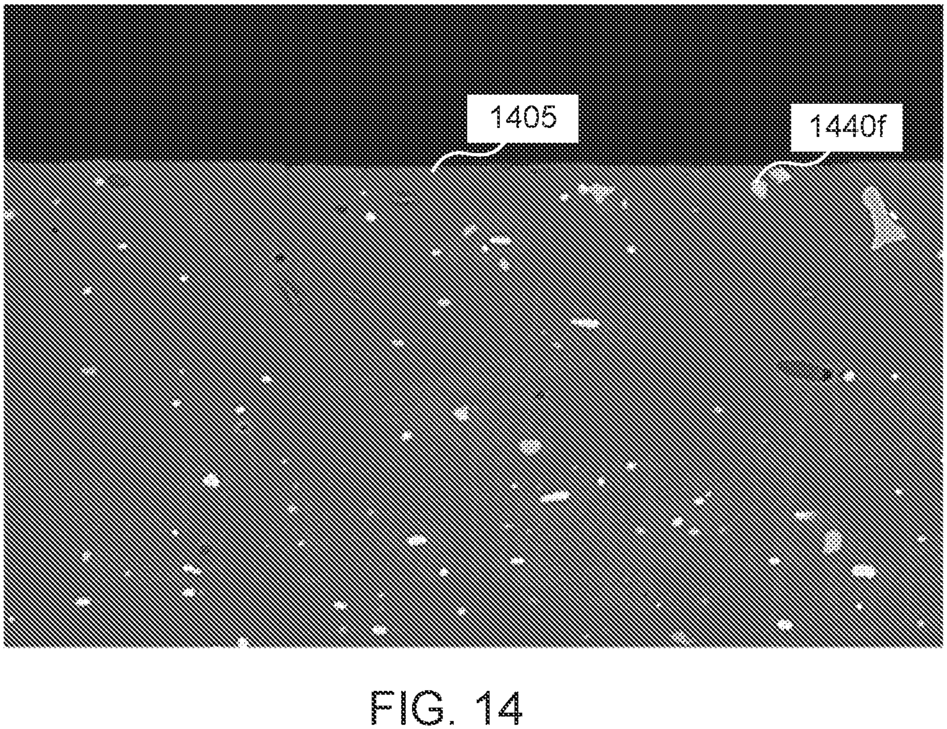
FIG. 14 is an electron micrograph image of the cross-section of FIG. 13 at lower magnification showing intermetallic particles in the near-surface microstructures.

FIG. 13 is an image obtained using Scanning Electron Microscopy (SEM) at full width field of view of 20 μm, 20K× magnification for a comparative example of AA7075, with original mill finish surface (without surface treatment). Near surface microstructures 1320 such as rolled-in oxides, intermetallic particles, and voids are evident by the micrograined morphology beneath surface 1305. Surface 1305 is coated with gold (Au) for imaging purposes using SEM. Intermetallic particles appear **1340*f* brightly colored and are distributed throughout the near-surface microstructure 1320. FIG. 14 is an image obtained with SEM at full width field of view of 40 μm, at a lower 10K× magnification, showing the proximity of intermetallic particles 1440*f* relative to the surface of the untreated mill finished surface 1405**.

Figure 15:
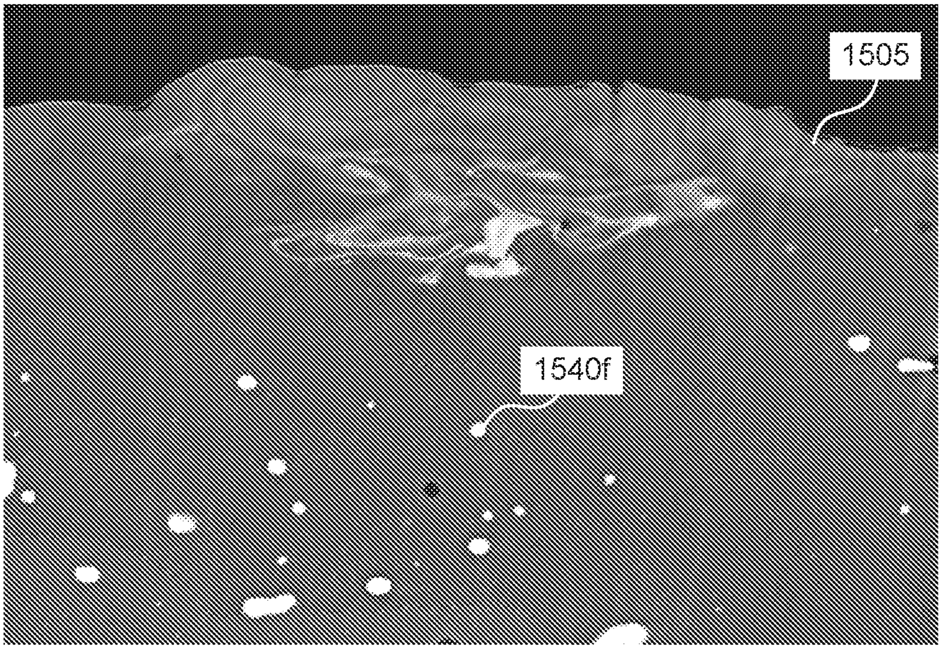
FIG. 15 is an electron micrograph image of a cross-section of an aluminum alloy product having a surface treated with a laser at 50% overlap between passes showing a microstructure near the surface with fewer near-surface microstructures.
Figure 16:
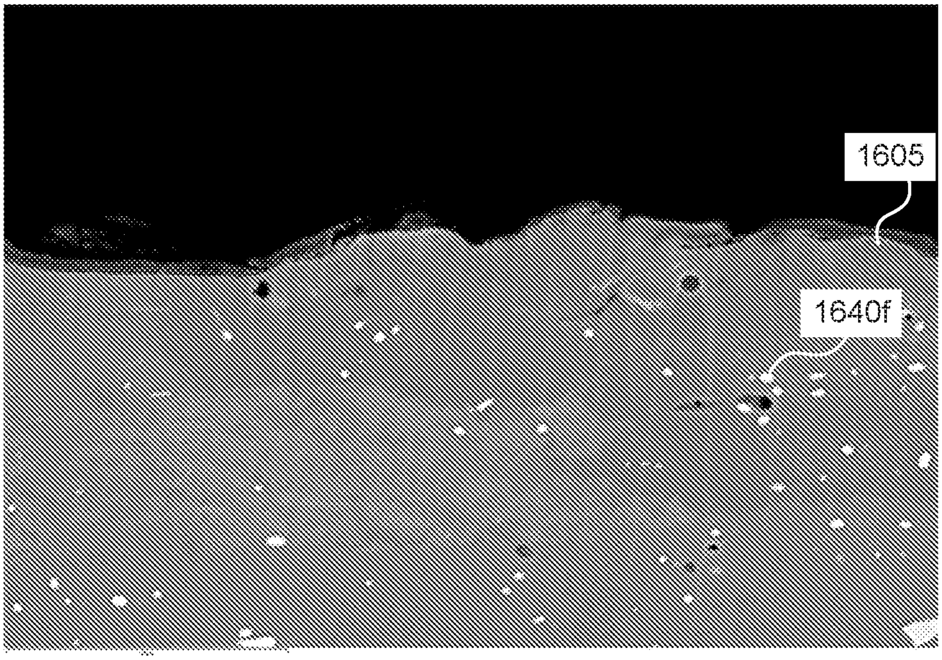
FIG. 16 is an electron micrograph image of the cross-section of FIG. 15 at lower magnification showing fewer intermetallic particles in the near-surface microstructures.

FIG. 15 is an image obtained using SEM at full width field of view of 20 μm, 20K× magnification, and FIG. 16 is an image obtained with SEM at full width field of view of 40 μm, at a 10K× magnification, for an example of AA7075 where the surface was laser ablated with 50% overlap between pulses (CL300 Watt high intensity laser at overlap 50% per subsequent pulse at 300 W and a spot size of 428 μm). As shown in FIG. 15, near surface microstructures such as rolled-in oxides, intermetallic particles **1540*f*, and voids are fewer or not evident at all beneath surface 1505 for the laser treated surface as there is a lack of micrograined morphology. As shown in FIG. 16 there are fewer intermetallic particles 1640*f* evident to a depth of about 5 μm from surface 1605 as compared to the surface of the mill finish surface in the comparative example as shown in FIG. 14**.

ILLUSTRATIVE ASPECTS

As used below, any reference to a series of aspects (e.g., "Aspects 1-4") or non-enumerated group of aspects (e.g., "any previous or subsequent aspect") is to be understood as a reference to each of those aspects disjunctively (e.g., "Aspects 1-4" is to be understood as "Aspects 1, 2, 3, or 4").

Aspect 1 is a method comprising: providing an aluminum alloy product having a bulk and a first surface, scanning a beam of high energy across the first surface, wherein the beam of high energy interacts with the first surface to physically modify the first surface to form a treated first surface.

Aspect 2 is the method of any previous subsequent aspect, further comprising applying a first liquid layer onto the first surface prior to scanning a beam of high energy, wherein scanning a beam of high energy is across the first liquid layer and the beam of high energy interacts with the first liquid layer to form the treated first surface.

Aspect 3 is the method of any previous subsequent aspect, wherein the treated first surface exhibits a bond durability of from 45 cycles to 125 cycles, or more, according to a FLTM BV 101-07 standard test.

Aspect 4 is the method of any previous subsequent aspect, wherein the aluminum alloy product comprises a 5xxx series aluminum alloy, a 6xxx series aluminum alloy, or a 7xxx series aluminum alloy.

Aspect 5 is the method of any previous subsequent aspect, wherein the beam of high energy interacts with the first liquid layer to physically modify the at least a portion of the bulk, wherein the bulk comprises intermetallic particles and a matrix including grains of an aluminum alloy, to form a treated sub-surface layer.

Aspect 6 is the method of any previous subsequent aspect, wherein the treated sub-surface layer comprises a resolidified layer of the aluminum alloy having been previously melted by the beam of high energy, wherein the sub-surface layer occupies a depth into the aluminum alloy product of from 1 μm to 10 μm, and wherein a first concentration of intermetallic particles in the treated sub-surface layer is less than a second concentration of intermetallic particles in the bulk.

Aspect 7 is the method of any previous subsequent aspect, wherein the first liquid layer has a thickness of from 1 nm to 1 mm.

Aspect 8 is the method of any previous subsequent aspect, wherein the first liquid layer has a thickness of from 1 mm to 5 mm.

Aspect 9 is the method of any previous subsequent aspect, further comprising applying a second liquid layer to a second surface, wherein the second surface is opposite the first surface.

Aspect 10 is the method of any previous subsequent aspect, wherein the second liquid has a thickness of from 1 nm to 1 mm.

Aspect 11 is the method of any previous subsequent aspect, wherein the second liquid layer has a thickness of from 1 mm to 5 mm.

Aspect 12 is the method of any previous subsequent aspect, wherein the second liquid layer is the same as the first liquid layer.

Aspect 13 is the method of any previous subsequent aspect, wherein the second liquid layer is different than the first liquid layer.

Aspect 14 is the method of any previous subsequent aspect, wherein at least one of the first liquid layer and the second liquid layer comprises a condensed vapor.

Aspect 15 is the method of any previous subsequent aspect, wherein at least one of the first liquid layer and the second liquid layer comprises an aqueous solution.

Aspect 16 is the method of any previous subsequent aspect, wherein at least one of the first liquid layer and the second liquid layer comprises a non-aqueous solution.

Aspect 17 is the method of any previous subsequent aspect, wherein at least one of the first liquid layer and the second liquid layer comprise glycerin, alcoholic solutions, steam, or any combination thereof.

Aspect 18 is the method of any previous subsequent aspect, wherein at least one of the first liquid layer and the second liquid layer comprises a pretreatment chemical configured to at least one of inhibit corrosion, texturize the surface, and increase adhesion, the pretreatment chemical chosen from organophosphonic acid, organophosphinic acid, a silane, a coupling agent, a polymer, a copolymer, a Zr/Mo pretreatment, a Mn-based pretreatment, a Ce-based pretreatment, or combinations thereof.

Aspect 19 is the method of any previous subsequent aspect, wherein the first liquid layer and the second liquid layer are applied onto the first surface and the second surface by two or more applicators.

Aspect 20 is the method of any previous subsequent aspect, wherein the two or more applicators comprise a spray applicator with or without pulsing, a low pressure high volume spray applicator, a low pressure low volume spray applicator, a rotary atomizer, an electrostatic applicator, a roll applicator, or any combination thereof.

Aspect 21 is the method of any previous subsequent aspect, the two or more applicators are in a continuous line.

Aspect 22 is the method of any previous subsequent aspect, wherein the two or more applicators are configured as two or more applicator baths.

Aspect 23 is the method of any previous subsequent aspect, wherein scanning a beam of high energy across the first liquid layer includes directing a beam of laser energy onto the first liquid layer.

Aspect 24 is the method of any previous subsequent aspect, wherein the beam of laser energy is provided by a continuous laser, a pulsed laser, a nanosecond pulsed laser, a picosecond pulsed laser, a femtosecond pulsed laser, a single pass configuration, a double pass configuration, a laser with continuous wave, a laser without continuous wave, or any combination thereof.

Aspect 25 is the method of any previous subsequent aspect, wherein the beam of laser energy is provided by a ytterbium laser, a Nd-YAG laser, a CO2 laser, an excimer laser, or any combination thereof.

Aspect 26 is the method of any previous subsequent aspect, wherein the beam of laser energy has a wavelength from about 200 nm to about 1500 nm.

Aspect 27 is the method of any previous subsequent aspect, wherein scanning the beam of high energy across the first liquid layer includes directing at least one beam of laser energy onto the first liquid layer, and wherein the method further includes directing another at least one beam of laser energy onto the second liquid layer.

Aspect 28 is the method of any previous subsequent aspect, wherein the first surface is an untreated first surface.

Aspect 29 is the method of any previous subsequent aspect, wherein the untreated first surface has one or more of organics, oils, hydrocarbons, soils, or inorganic residues thereon, and wherein the treated first surface is devoid of or substantially devoid of one or more of organics, oils, hydrocarbons, soils, or inorganic residues.

Aspect 30 is the method of any previous subsequent aspect, wherein the untreated first surface has not been subjected to one or more wet processing steps selected from chemical etching, acidic or alkaline cleaning, solvent cleaning, vapor degreasing, mechanical surface treatment, brushing, buffing, mechanical surface polishing, electrochemical polishing, chemical polishing, surfactant cleaning, and conversion coating.

Aspect 31 is the method of any previous subsequent aspect, wherein the untreated first surface has not been subjected to the one or more wet processing steps prior to directing the beam of high energy onto the untreated first surface.

Aspect 32 is the method of any previous subsequent aspect, wherein the untreated first surface corresponds to a rolled surface having a rolling lubricant thereon.

Aspect 33 is the method of any previous subsequent aspect, wherein directing a beam of high energy onto the untreated first surface corresponds to a dry cleaning process, and wherein the treated first surface corresponds to a cleaned surface.

Aspect 34 is the method of any previous subsequent aspect, wherein directing a beam of high energy onto the untreated first surface corresponds to a dry surface modification process, and wherein the treated first surface corresponds to an activated surface suitable for bonding with an adhesive.

Aspect 35 is the method of any previous subsequent aspect, wherein the first surface comprises near-surface microstructures and wherein directing the beam of energy onto the first surface removes or eliminates at least a portion of the near-surface microstructures.

Aspect 36 is the method of any previous subsequent aspect, wherein directing the beam of high energy onto the first surface thermally modifies the near-surface microstructures.

Aspect 37 is the method of any previous subsequent aspect, wherein the treated first surface exhibits a dry static friction coefficient of from 0.1 to 0.5.

Aspect 38 is an aluminum alloy product, comprising: a rolled aluminum alloy substrate, the rolled aluminum alloy substrate comprising: a bulk, wherein the bulk comprises intermetallic particles and a matrix including grains of an aluminum alloy; a laser-treated area covering a first portion of the bulk, wherein the laser-treated area comprises: a treated sub-surface layer, wherein the treated sub-surface layer comprises a resolidified layer of the aluminum alloy having been previously melted by a beam of high energy, wherein the treated sub-surface layer occupies a depth into the aluminum alloy product of from 1 μm to 10 μm, and wherein a first concentration of intermetallic particles in the treated sub-surface layer is less than a second concentration of intermetallic particles in the bulk; and a laser processed surface layer, wherein the laser processed surface layer is substantially devoid of near surface microstructures and one or more of organics, oils, hydrocarbons, soils, inorganic residues, rolled-in oxides, or anodic oxides, and wherein the laser processed surface layer comprises a first oxide layer having a thickness of from 10 nm to 300 nm.

Aspect 39 is the aluminum alloy product of any previous subsequent aspect, wherein the aluminum alloy comprises a 5xxx series aluminum alloy, a 6xxx series aluminum alloy, or a 7xxx series aluminum alloy.

Aspect 40 is the aluminum alloy product of any previous subsequent aspect, wherein a concentration of magnesium in the aluminum alloy is less than 10 wt. %.

Aspect 41 is the aluminum alloy product of any previous subsequent aspect, wherein a concentration of magnesium in the bulk is greater than in the treated sub-surface layer or wherein a concentration of zinc in the bulk is greater than in the treated sub-surface layer.

Aspect 42 is the aluminum alloy product of any previous subsequent aspect, wherein the laser treated area exhibits a bond durability of from 45 cycles to 125 cycles, or more, according to a FLTM BV 101-07 standard test.

Aspect 43 is the aluminum alloy product of any previous subsequent aspect, wherein the aluminum alloy product does not include a functionalized layer thereon, such as a phosphorus containing organic acid coating.

Aspect 44 is the aluminum alloy product of any previous subsequent aspect, further comprising an untreated area covering a second portion of the bulk, wherein the untreated area is not or has not been subjected a laser treatment process.

Aspect 45 is the aluminum alloy product any previous subsequent aspect, wherein a first arithmetical mean height (Spk) of the laser treated area is less than a second arithmetical mean height of the untreated area.

Aspect 46 is the aluminum alloy product of any previous subsequent aspect, wherein the laser-treated area exhibits an arithmetical mean height (Sa) of from 0.1 μm to 10 μm.

Aspect 47 is the aluminum alloy product of any previous subsequent aspect, wherein the laser-treated area exhibits complexity (Sdr) of from 0.1% to 80%.

Aspect 48 is the aluminum alloy product of any previous aspect, wherein the laser-treated area exhibits a surface stability of up to 3 months.

All patents, publications and abstracts cited above are incorporated herein by reference in their entirety. The foregoing description of the embodiments, including illustrated embodiments, has been presented only for the purpose of illustration and description and is not intended to be exhaustive or limiting to the precise forms disclosed. Numerous modifications, adaptations, and uses thereof will be apparent to those skilled in the art.

What is claimed is:

1. A method comprising:

providing an aluminum alloy product having a bulk and a first surface, applying a first liquid layer onto the first surface, scanning a beam of high energy across the first liquid layer, wherein the beam of high energy interacts with the first liquid layer to physically modify at least a portion of the bulk, wherein the bulk comprises intermetallic particles and a matrix including grains of an aluminum alloy, to form a treated sub-surface layer, wherein the treated sub-surface layer comprises a resolidified layer of the aluminum alloy having been previously melted by the beam of high energy, wherein the sub-surface layer occupies a depth into the aluminum alloy product of from 1 μm to 10 μm, and wherein a first concentration of intermetallic particles in the treated sub-surface layer is less than a second concentration of intermetallic particles in the bulk.

2. The method of claim 1, wherein the first surface, after the scanning of the beam of high energy across the first liquid layer, exhibits a bond durability of from 45 cycles to 125 cycles, or more, according to a FLTM BV 101-07 standard test.

3. The method of claim 1, wherein scanning a beam of high energy across the first liquid layer includes directing a beam of laser energy onto the first liquid layer.

4. The method of claim 3, wherein the beam of laser energy is provided by a continuous laser, a pulsed laser, a nanosecond pulsed laser, a picosecond pulsed laser, a femtosecond pulsed laser, a single pass configuration, a double pass configuration, a laser with continuous wave, a laser without continuous wave, or any combination thereof, or wherein the beam of laser energy is provided by a ytterbium laser, a Nd-YAG laser, a CO2 laser, an excimer laser, or any combination thereof.

5. The method of claim 1, wherein the first surface is an untreated first surface.

6. The method of claim 5, wherein the untreated first surface has one or more of organics, oils, hydrocarbons, soils, or inorganic residues thereon, and wherein the first surface, after the scanning of the beam of high energy across the first liquid layer, is devoid of or substantially devoid of one or more of organics, oils, hydrocarbons, soils, or inorganic residues.

7. The method of claim 5, wherein the untreated first surface has not been subjected to one or more wet processing steps selected from chemical etching, acidic or alkaline cleaning, solvent cleaning, vapor degreasing, mechanical surface treatment, brushing, buffing, mechanical surface polishing, electrochemical polishing, chemical polishing, surfactant cleaning, and conversion coating.

8. The method of claim 7, wherein the untreated first surface has not been subjected to the one or more wet processing steps prior to directing the beam of high energy onto the untreated first surface.

9. The method of claim 5, wherein the untreated first surface corresponds to a rolled surface having a rolling lubricant thereon.

10. The method of claim 1, wherein the first surface comprises near-surface microstructures and wherein directing the beam of energy onto the first surface removes or eliminates at least a portion of the near-surface microstructures or wherein directing the beam of high energy onto the first surface thermally modifies the near-surface microstructures.

11. The method of claim 1, wherein the first surface, after the scanning of the beam of high energy across the first liquid layer, exhibits a dry static friction coefficient of from 0.1 to 0.5.

12. An aluminum alloy product, comprising:

a rolled aluminum alloy substrate, the rolled aluminum alloy substrate comprising:

a bulk, wherein the bulk comprises intermetallic particles and a matrix including grains of an aluminum alloy;

a laser-and-liquid-treated area covering a first portion of the bulk, wherein the laser-and-liquid-treated area comprises:

a treated sub-surface layer, wherein the treated sub-surface layer comprises a resolidified layer of the aluminum alloy having been previously melted by a beam of high energy, wherein the treated sub-surface layer occupies a depth into the aluminum alloy product of from 1 μm to 10 μm, and wherein a first concentration of intermetallic particles in the treated sub-surface layer is less than a second concentration of intermetallic particles in the bulk; and a laser and liquid processed surface layer, wherein the laser and liquid processed surface layer is substantially devoid of near surface microstructures and one or more of organics, oils, hydrocarbons, soils, inorganic residues, rolled-in oxides, or anodic oxides, and wherein the laser and liquid processed surface layer comprises a first oxide layer having a thickness of from 10 nm to 300 nm.

13. The aluminum alloy product of claim 12, wherein a concentration of magnesium in the aluminum alloy is less than 10 wt. %, wherein a concentration of magnesium in the bulk is greater than in the treated sub-surface layer, or wherein a concentration of zinc in the bulk is greater than in the treated sub-surface layer.

14. The aluminum alloy product of claim 12, wherein the laser-and-liquid-treated area exhibits a bond durability of from 45 cycles to 125 cycles, or more, according to a FLTM BV 101-07 standard test.

15. The aluminum alloy product of claim 12, wherein the aluminum alloy product does not include a functionalized layer thereon.

16. The aluminum alloy product of claim 12, further comprising an untreated area covering a second portion of the bulk, wherein the untreated area is not or has not been subjected a laser treatment process, and wherein a first arithmetical mean height (Spk) of the laser-and-liquid-treated area is less than a second arithmetical mean height of the untreated area.

17. The aluminum alloy product of claim 12, wherein the laser-and-liquid-treated area exhibits an arithmetical mean height (Sa) of from 0.1 μm to 10 μm, a complexity (Sdr) of from 0.1% to 80%, or a surface stability of up to 3 months.

* * * * *